United States Patent
Wolter et al.

(10) Patent No.: US 11,618,211 B2
(45) Date of Patent: Apr. 4, 2023

(54) PRODUCTION OF MOLDED BODIES FROM AN INORGANIC-ORGANIC HYBRID POLYMER WITH HIGH RESOLUTION USING 3D PRINTING, MOLDED BODIES WITH A HIGH FLEXURAL STRENGTH AND ELASTIC MODULUS, AND THE USE THEREOF FOR DENTAL PURPOSES

(71) Applicant: Fraunhofer-Gesellschaft zur Foerderung der angewandten Forschung e.V., Munich (DE)

(72) Inventors: Herbert Wolter, Wuerzburg (DE); Carina Kolb, Wuerzburg (DE); Jeannette Hoffmann, Wuerzburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 16 days.

(21) Appl. No.: 17/260,237

(22) PCT Filed: Jul. 17, 2019

(86) PCT No.: PCT/EP2019/069208
§ 371 (c)(1),
(2) Date: Jan. 14, 2021

(87) PCT Pub. No.: WO2020/016282
PCT Pub. Date: Jan. 23, 2020

(65) Prior Publication Data
US 2021/0299950 A1    Sep. 30, 2021

(30) Foreign Application Priority Data
Jul. 20, 2018 (DE) .......................... 102018117617.1

(51) Int. Cl.
*B29C 64/129* (2017.01)
*B33Y 10/00* (2015.01)
(Continued)

(52) U.S. Cl.
CPC ........ *B29C 64/129* (2017.08); *A61C 13/0003* (2013.01); *B29C 64/188* (2017.08);
(Continued)

(58) Field of Classification Search
CPC ................ B29C 64/106; B29C 64/124; B29C 64/129; B29C 64/264; B29C 64/245; B29C 64/188; B33Y 10/00; B33Y 80/00; B33Y 40/20
See application file for complete search history.

(56) References Cited

U.S. PATENT DOCUMENTS 5,233,006 A    8/1993   Wolter et al.
5,279,881 A    1/1994   Kotani
(Continued)

FOREIGN PATENT DOCUMENTS

DE    1964378 A1    7/1971
DE    10018405 A1   10/2001
(Continued)

OTHER PUBLICATIONS

Samuel Clark Ligon, et al., Polymers for 3D Printing and Customized Additive Manufacturing, Chemical Reviews, ACS Publication, 2017 American Chemical Society, Chem. Rev. 2017, 117, 10212-10290.
(Continued)

*Primary Examiner* — Nahida Sultana
(74) *Attorney, Agent, or Firm* — Duane Morris LLP

(57) ABSTRACT

The invention relates to a method for producing a shaped body by means of a radiation-induced printing process according to the technique of the one-photon polymerization process, characterized in that
(Continued)

the shaped body is produced by solidifying a liquid or viscous material which contains a polysiloxane component produced by hydrolytic condensation of one or more monomeric silanes having exclusively two or three hydrolyzable groups and at least one organically polymerizable radical being bonded to the silicon atom via carbon, and contains an initiator and/or catalyst for the radiation-induced polymerization of the organically polymerizable residue, and the solidification is effected by directing light onto a region of a surface of a substrate, whereby a layer of the material located there is polymerized and thereby solidified, whereupon further layers are successively solidified.

Furthermore, the invention relates to a shaped body based on an organically polymerized silica (hetero)polycondensate, which was produced by organic polymerization of the aforementioned polysiloxane component, with superior mechanical properties.

13 Claims, 4 Drawing Sheets

(51) Int. Cl.
| | |
|---|---|
| B33Y 70/00 | (2020.01) |
| B33Y 80/00 | (2015.01) |
| B29C 64/264 | (2017.01) |
| B29C 64/188 | (2017.01) |
| B29C 64/245 | (2017.01) |
| C08K 3/013 | (2018.01) |
| B33Y 40/20 | (2020.01) |
| A61C 13/00 | (2006.01) |
| C08G 77/06 | (2006.01) |
| C08G 77/18 | (2006.01) |
| B29K 105/16 | (2006.01) |
| B29L 31/00 | (2006.01) |

(52) U.S. Cl.
CPC .......... *B29C 64/245* (2017.08); *B29C 64/264* (2017.08); *B33Y 10/00* (2014.12); *B33Y 40/20* (2020.01); *B33Y 70/00* (2014.12); *B33Y 80/00* (2014.12); *C08G 77/06* (2013.01); *C08G 77/18* (2013.01); *C08K 3/013* (2018.01); *B29K 2105/162* (2013.01); *B29K 2995/0046* (2013.01); *B29K 2995/0082* (2013.01); *B29K 2995/0097* (2013.01); *B29L 2031/7536* (2013.01); *C08K 2201/011* (2013.01)

(56) References Cited

U.S. PATENT DOCUMENTS

| | | | |
|---|---|---|---|
| 5,399,738 | A | 3/1995 | Wolter et al. |
| 5,414,093 | A | 5/1995 | Wolter |
| 5,532,398 | A | 7/1996 | Wolter et al. |
| 5,717,125 | A | 2/1998 | Wolter et al. |
| 6,124,491 | A | 9/2000 | Wolter et al. |
| 6,794,527 | B1 | 9/2004 | Wolter et al. |
| 7,432,385 | B2 | 10/2008 | Wolter |
| 7,780,897 | B2 | 8/2010 | Wicker et al. |
| 7,932,414 | B2 | 4/2011 | Wolter |
| 8,076,441 | B2 | 12/2011 | Wolter |
| 8,197,743 | B2 | 6/2012 | Wicker et al. |
| 8,748,647 | B2 | 6/2014 | Wolter |
| 9,206,205 | B2 | 12/2015 | Wolter et al. |
| 9,233,992 | B2 | 1/2016 | Wolter et al. |
| 9,795,541 | B2 | 10/2017 | Fontein et al. |
| 10,227,364 | B2 | 3/2019 | Wolter et al. |
| 10,736,820 | B2 | 8/2020 | Moszner et al. |
| 2004/0138490 | A1 | 7/2004 | Wolter |
| 2006/0237880 | A1 | 10/2006 | Wicker et al. |
| 2007/0135572 | A1 | 6/2007 | Wolter |
| 2008/0317794 | A1 | 12/2008 | Gellermann et al. |
| 2008/0319127 | A1 | 12/2008 | Wolter |
| 2011/0059292 | A1 | 3/2011 | Wicker et al. |
| 2011/0082250 | A1 | 4/2011 | Wolter |
| 2014/0221521 | A1 | 8/2014 | Wolter et al. |
| 2014/0249325 | A1 | 9/2014 | Wolter et al. |
| 2015/0274862 | A1 | 10/2015 | Wolter et al. |
| 2016/0128909 | A1 | 5/2016 | Fontein et al. |
| 2016/0185804 | A1 | 6/2016 | Wolter et al. |
| 2016/0332367 | A1 | 11/2016 | Sun et al. |
| 2017/0360534 | A1 | 12/2017 | Sun et al. |
| 2018/0066115 | A1 | 3/2018 | Achenbach et al. |
| 2020/0087241 | A1 | 3/2020 | Moszner et al. |
| 2021/0354370 | A1* | 11/2021 | Wolter ............... C08G 75/045 |

FOREIGN PATENT DOCUMENTS

| | | |
|---|---|---|
| DE | 102011050672 A1 | 11/2012 |
| WO | 2016134972 A1 | 9/2016 |
| WO | 2018058135 A1 | 3/2018 |

OTHER PUBLICATIONS

Irina K. Lutskaya, Fluoreszenz von Zahnhartsubstanz und Füllungsmaterialien, Dentalforum, Dec. 6, 2011, pp. 808-812.

European Patent Office (ISA), International Search Report for PCT/EP2019/069208, dated Nov. 6, 2019.

* cited by examiner

PRODUCTION OF MOLDED BODIES FROM AN INORGANIC-ORGANIC HYBRID POLYMER WITH HIGH RESOLUTION USING 3D PRINTING, MOLDED BODIES WITH A HIGH FLEXURAL STRENGTH AND ELASTIC MODULUS, AND THE USE THEREOF FOR DENTAL PURPOSES

The present invention relates to a process for the production of shaped bodies which are particularly suitable for use in dental technology and other medical fields. The shaped bodies are printed by means of a rapid process under the influence of light; they are based on an organically cross-linked silica polycondensate, which may contain further additives as required. The invention also relates to shaped bodies with superior mechanical properties.

Teeth are not only indispensable for chewing, they also play an important role in speech and are of great importance for aesthetic reasons. Damage to teeth caused by caries or the partial or total loss of teeth increases with age. This potential group of patients of higher age is increasing due to higher life expectancy. Therefore, it is all the more important to find an inexpensive yet high-quality solution for dental restorative materials in the form of e.g. crowns, bridges and the like as well as their manufacturing processes. What is desired is an uncomplicated, automated production process in combination with a highly aesthetic, load-stable material.

On the material side, various types of materials have been used for dental prostheses to date, such as ceramics, polymethyl methacrylate-(PMMA)-based materials and metals. However, all three types have significant disadvantages. Ceramic teeth exhibit brittle behavior and are therefore highly susceptible to fracture. Furthermore, their great hardness can lead to damage to the opposite tooth. PMMA is questionable due to the release of residual monomers for reasons of biocompatibility. Moreover, this material shows insufficient resistance to wear. Finally, metals such as gold are not convincing, particularly in terms of their aesthetics. As a new class of materials for dental restorations, hybrid, silica-based materials (ORMOCER®-based composites) offer a promising alternative. These have lower shrinkage than purely organic materials; at the same time, shaped bodies made from them have superior mechanical properties.

In addition to dental applications for temporary and permanent dentures, such as crowns, bridges, inlays, onlays, overlays, veneers, denture base and denture teeth and for splints (e.g. hard and soft aligners/orthodontic splints, bite splints), drilling templates, gum masks, further starting points for improvement can be found wherever individual components or small series with high requirements regarding mechanical and tribological properties and high biocompatibility are needed, such as in many other areas in the medical sector. For example, it would be desirable to facilitate the production of improved carriers for tissue engineering, e.g. for customized implants or in orthopedics.

A currently very common manufacturing method for dental restorations, such as crowns and bridges for final use is CAD/CAM milling. Here, the desired geometry is milled out of a prefabricated CAD/CAM block by means of a CAD/CAM milling unit. However, this subtractive manufacturing method has the disadvantage that a large part of the material block must be removed until the denture is milled out. Thus, in addition to the high amount of work involved, there is also a large loss of material because the material cannot be reused, which increases the overall material costs. Furthermore, certain geometries such as undercuts cannot be realized or can only be realized with great effort. Therefore, it can also be that healthy tooth tissue of the patient must be removed so that the milled crown can be put on. In addition, only one tooth part can be milled at a time, so the machining of the respective parts must be done one after the other. The CAD/CAM blocks must also be manufactured in advance, for which purpose composite materials are currently being cast in corresponding block molds. This requires a low viscosity of the materials, which is associated with a low filler content. This in turn leads to insufficient mechanical properties. For high strength with high modulus of elasticity and high abrasion resistance, a high filler content and thus a high viscosity of the composites is usually associated. These kneadable composites must then often be shaped by hand, possibly under pressure, and then cured, whereby bubble-free shaping is difficult to achieve. Another possibility is the production of large composite plates, which after curing must be sawn into the corresponding block moulds, which requires complex multi-dimensional cuts. This means additional costs for expensive, rapidly wearing saw blades and the associated considerable loss of material.

An alternative approach is sought in the so-called stereolithography. For this purpose, the material to be solidified is brought into a bath in liquid or paste form. A platform movable in z-direction is placed in the bath in such a way that a thin layer of the bath material can be exposed and solidified. The solidification is carried out with a light beam emitted by a laser, which is guided over the area to be solidified. The platform is then moved in the z-direction (lowered when the light beam is directed into the bath from above, raised when it is exposed through the bottom of the bath) so that another layer can be exposed with the beam. In DE 199 50 284 A1, various organically polymerizable materials are proposed as base materials for this process, including polysiloxanes, although in this application only purely organic base materials have actually been investigated.

Digital Light Processing technology (DLP), which is a lithography-based 3D printing process, involves the additive layer-by-layer production of components based on a CAD data set as a 3D geometric model. Photosensitive, resin-based materials are cured over the entire surface by mask exposure, see DE 10 2014 116 402 A1, page 2. The process is much faster than stereolithography because of the two-dimensional exposure. In addition, the same time is required for each layer hardening, regardless of how its cross-section is relative to that of other layers.

3D printing overcomes some of these disadvantages. The advantage over CAD/CAM technology is that there is hardly any loss of material, since uncured material is recyclable. Furthermore, complex geometries such as undercuts or cavities can be easily produced, and last but not least, it is possible to print several different, individual components simultaneously in one process, which saves time. US 2016/0332367 A1 describes a three-dimensional printing system for the rapid production of (dental) products. Flowable materials on a purely organic basis serve as starting materials. EP 3 090 722 A1 reveals chain transfer polymerization-curable dental materials, also on a purely organic basis, which are suitable for 3D printing. Products manufactured using Digital Light Processing are also already on the market. Accordingly, the number of printers on offer, which are constantly being improved, is also increasing.

3D printing is discussed in more detail in the following article, among others: S. Ligon, R. Liska, J. Stampfl et al, Polymers for 3D Printing and Customized Additive Manufacturing, *Chem Rev.* 2017, 117, 10212-10290.

However, 3D printing, and especially digital light processing, has the disadvantage of overcuring. This is an overpolymerization of the material to be cured, particularly in the z-axis, which occurs primarily in translucent components and results in dimensional accuracy no longer being guaranteed. This occurs with overhanging and undercut parts, as there is no boundary with an overlying layer (e.g. in the DLP process) or an underlying layer (e.g. in stereolithography).

Recently, the development of improved 3D printers that work similar to DLP and the improvement of existing DLP printers has been accelerated. This includes the ability to print on higher viscosity materials, such as with doctor blade or film systems, and to increase printing speed, such as continuous exposure by utilizing the oxygen inhibition layer of materials. For both, the materials that can be used according to the invention have certain advantages, so that they can be used directly and/or adapted to the corresponding printer principles with little effort, so that they can be used for the new processes as well.

In addition to the printers themselves, the material plays at least as important a role in the successful realization of individual dental components. For 3D printing using the DLP principle, photopolymers with a certain flowability are required, which in turn requires only a low filler content. This often results in inadequate mechanical properties, since high strength and abrasion resistance is usually associated with a high filler content and thus high viscosity of the composites. For this reason, conventional dental composites suitable for dental prostheses cannot simply be used for this printing process. Resin systems with sufficiently low viscosity that have been available on the market so far do not have sufficient mechanical properties for permanent use for e.g. crowns and bridges. A further limitation, which has not yet made it possible to use 3D-printed components for long-term applications, is the insufficient biocompatibility. Most of the known materials are unfilled photopolymers, which are only suitable for short-term use in the mouth, e.g. for drilling templates, X-ray templates, bite splints or temporary crowns and bridges, for the reasons mentioned above. For example, no 3D printable material is known to date for permanent oral application with high stress, such as for crowns and bridges. There is therefore no material that can completely overcome the mechanical and biocompatible deficits and be used for permanent restorations.

DE 10 2014 116 402 A1 discloses the use of radically curable compositions in generative manufacturing processes, preferably in stereolithography and digital light processing, which, in addition to further additives, contain substituted chain-shaped and/or cyclic and/or cage-shaped polysiloxanes with at least 3 silicon atoms as well as disiloxanes substituted with radically polymerizable groups. The addition of the disiloxanes is proposed to reduce the viscosity of the starting material on the one hand and to improve the accuracy in the structure of the shaped bodies on the other hand. The viscosity of the base material used as well as flexural strength, modulus of elasticity and shrinkage were measured, partly on conventionally cured rods and partly on samples produced by 3D printing. The results for some of the conventionally cured rods were compared with rods made in the same way, which did not contain disiloxane, and it was found that the addition of the disiloxanes increased the strength values. However, such tests were not performed with specimens produced by 3D printing.

It is therefore the object of the invention to overcome the disadvantages of the state of the art and to provide a method with which the necessary requirements for permanent dental and other applications can be mastered better than before. Furthermore, the object of the invention is to provide shaped bodies, in particular those which are suitable as predominantly permanent dental prostheses such as crowns and bridges, with improved mechanical properties.

The problem is solved by a process which is characterized on the one hand by the use of a 3D printing process working with light, preferably by means of digital light processing, and on the other hand by the use of resin systems which are based on a condensed silane-based system and which is preferably functionalized with groups containing reactive C=C double bonds, such as (meth)acrylic or norbornenyl groups and/or with ring-opening polymerizable groups. The resin systems have a sufficiently low viscosity for printing; at the same time, it is possible to produce shaped bodies that can be used in the dental field and that have improved strength, especially compared to cast and post-processed bodies.

The inventors of the present invention were able to establish on the basis of concrete investigations using Digital Light Processing that the addition of disiloxanes to the bath material as described in DE 10 2014 116 402 A1 is not necessary at all to obtain outstanding properties of the shaped bodies produced in this way. Instead, it turned out surprisingly that it is precisely the use of the printing process that leads to a substantial improvement in the mechanical values of shaped bodies produced from silane resins, compared with two-sided exposure of the entire body in a mold after conventional production. According to the inventors of the present invention, the relatively complex production process and the addition of an additional disiloxane can therefore not only be dispensed with, but—contrary to the expectations mentioned in the application mentioned above—the lack of such a process even leads to shaped bodies with superior mechanical properties.

The invention concerns the following points [1] to [26]:

[1] A method for producing a shaped body with the aid of a radiation-induced printing process according to the technique of the one-photon polymerization process, characterized in that the shaped body is produced by solidifying a liquid or viscous material which contains
a polysiloxane component formed by hydrolytic condensation of one or more monomeric silanes having exclusively two or three hydrolyzable groups and at least one organically polymerizable radical being bonded to the silicon atom via carbon, and
an initiator and/or catalyst for the radiation-induced polymerization of the organically polymerizable radical, and
the solidification is effected by directing light from a radiation source onto a region of a surface of a substrate, a layer of the liquid or viscous material located there being subjected to organic polymerization by the action of radiation and thereby solidified, whereupon further layers of the liquid or viscous material, each of which is located on the layer of the last solidified material, are successively solidified with the aid of this radiation source.

[2] The method according to point [1], wherein the liquid or viscous material is in a bath container with a bottom which is at least partially transparent, and the substrate is a platform immersed in the liquid or viscous material and movable away from the bottom of the bath.

[3] The method according to point [1] or [2], wherein the irradiation is carried out with light of a wavelength in the range below 400 nm, preferably at 380 to 390 nm.

[4] The method according to one of points [1] to [3], wherein a phosphine oxide, preferably a diphenylphosphine oxide and most preferably 2,4,6-trimethylbenzoyldiphenylphosphine oxide, is added to the liquid or viscous material as an initiator for the light-induced polymerization.

[5] The method according to one of the above points, wherein the shaped body, after its formation in the interior of the bath, is removed from the latter, washed with a solvent, dried and is then either (a) thermally post-cured, whereby a peroxide can be added to the bath material as initiator for the thermal curing, or (b) post-cured by photoinitiation.

[6] The method according to any of the foregoing points, wherein the liquid or viscous material is a composite containing a particulate or fibrous additive.

[7] The method according to point [6], wherein the refractive index of the particulate additive before solidification is greater than that of the polysiloxane component, preferably by at least 0.05.

[8] The method according to point [6] or [7], wherein the particulate additive is an inorganic particle, preferably titanium dioxide, zirconium dioxide, zinc oxide, zinc sulfide, silicon dioxide or glass or a combination of several of the materials mentioned.

[9] The method according to any one of points [6] to [8], wherein the inorganic particles have an average primary particle diameter of 0.1 to 5 µm.

[10] The method according to any one of points [6] to [8], wherein the inorganic particles have an average primary particle diameter of 5 to 100 nm, preferably 5 to 30 nm, and are present in agglomerated or dispersed form.

[11] The method according to point [9] or [10], wherein the inorganic particles are provided with a coating which is modified with an organically polymerizable radical, such that this organically polymerizable radical is copolymerized together with the organically polymerizable radical of the hydrolytically condensed silane during the process.

[12] The method according to one of the preceding points, in which the liquid or viscous material comprises a material in particle form or dissolved in the polysiloxane component, which is capable of absorbing light of a wavelength corresponding to the wavelength of the radiation source used.

[13] The method according to point [12], wherein said material is a dissolved fluorescent material.

[14] The method according to point [12] or [13], wherein said material is an inorganic, particulate solid, preferably $ZrO_2$ with particle sizes in the range of 5 to 100 nm, particularly preferably 5 to 20 nm, and/or an organic compound dissolved in the polysiloxane component.

[15] The method according to any of the foregoing points, wherein the polysiloxane component contains aryl groups bonded to radicals bonded to silicon via carbon atoms.

[16] The method according to any of the foregoing points, wherein the polysiloxane component contains phosphonic acid groups, phosphinic acid groups, phosphate groups, sulphonic acid groups, sulphinic acid groups and/or carboxylic acid groups, each of which is attached to radicals bonded to silicon via carbon atoms.

[17] A shaped body based on an organically polymerized silica (hetero)polycondensate which has been formed by organic polymerization of a polysiloxane component which has been produced by hydrolytic condensation of one or more monomeric silanes having exclusively two or three hydrolysable groups and at least one organically polymerizable radical being bonded to the silicon atom via carbon, obtainable by the method of one of the foregoing claims, characterized in that the shaped body has a flexural strength, as determined with a 3-point flexural test according to test standard DIN EN ISO 4049: 2009 with the universal testing machine Z100 of the company Zwick/Roell, with the changes that instead of water storage a dry storage preceded and that the feed rate was 3 mm/min, of at least 60 MPa and/or a modulus of elasticity, as determined in the linear range of the stress-strain curve between 10-20 MPa over the secant, of at least 1.4 GPa.

[18] The shaped body according to point [17], which is built up in a spatial direction from individual layers with a thickness in the range of 10 to 150 µm or in which the layers have been created by continuous exposure to light.

[19] The shaped body according to point [17] or [18] with a translucency of at least 45%, preferably at least 55%, more preferably at least 65% and particularly preferably about 75%.

[20] The shaped body according to any of points [17] to [19] with a bending strength of at least 100 MPa and a modulus of elasticity of at least 3.2 GPa.

[21] Shaped body according to one of the points [17] to [20] in the form of a composite which, in addition to the organically polymerized silica (hetero)polycondensate, contains at least one filler selected from fillers consisting of agglomerated or dispersed inorganic nanoparticles having particle sizes in the range from 5 to 100 nm and particles in the size range from 150 nm to 5 µm and combinations thereof, wherein the filler content of the shaped body being at least 15% by weight, preferably from 20% to 65% by weight, and wherein the shaped body has a flexural strength of at least 130 MPa, preferably of at least 150 MPa, and/or a modulus of elasticity of at least 5.0 GPa.

[22] The shaped body according to point [21], which contains dispersed inorganic nanoparticles with particle sizes in the range of 5 to 100 nm and particles in the size range of 150 nm to 5 µm.

[23] The shaped body according to one of the points [17] to [22], which further comprises a material capable of absorbing light in the wavelength range from 320 nm to 480 nm and preferably from 380 nm to 420 nm.

[24] The shaped body according to point [23], wherein the material capable of absorbing light in the wavelength range from 280 nm to 800 nm and preferably from 360 nm to 650 nm has fluorescent properties.

[25] The shaped body according to one of the points [17] to [24], wherein the silica (hetero)polycondensate contains aryl groups, phosphonic acid, phosphinic acid, phosphate, sulfonic acid, sulfinic acid and/or carboxylic acid groups, each of which is bonded to radicals bonded to silicon via carbon atoms.

[26] The use of a shaped body according to one of the points [17] to [25] as a temporary or permanent dental prosthesis, in particular in the form of crowns, bridges, denture bases and denture teeth, as a prophylactic material, as a fissure sealant, as a splint for correcting teeth, as a tooth protector/mouthguard, e.g. for athletes, as a snoring splint, as a bite splint or as a creaking splint.

The figures explain the invention.

Figure 6:
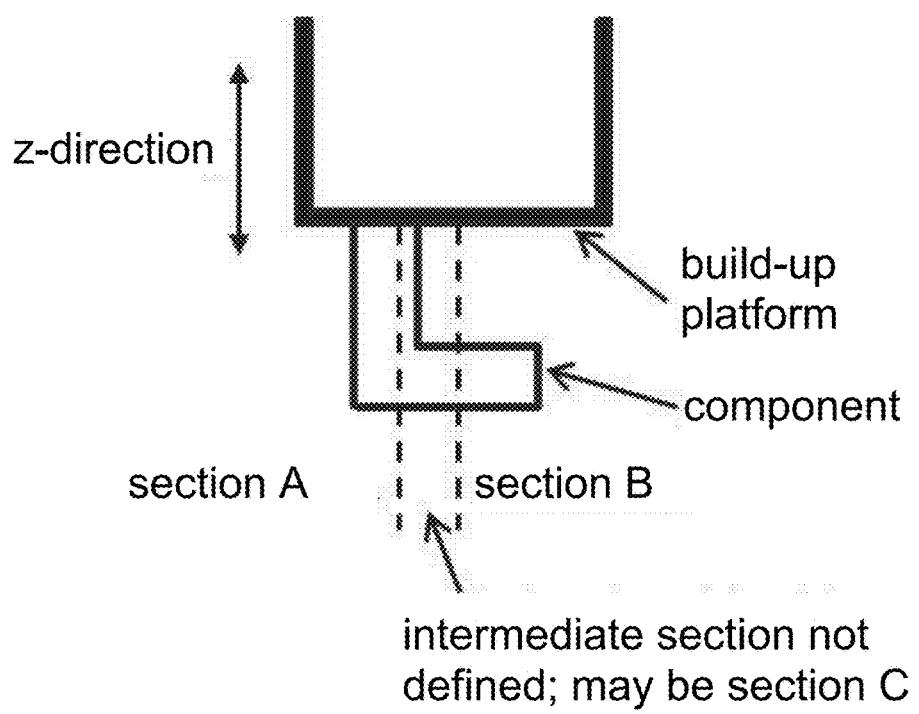

FIG. 6 schematically shows a test specimen with sections A and B for the FD.

The expression "printing process according to the technique of the one-photon polymerization process" is intended to clarify that, in the process according to the invention, the material is not polymerized according to the two-photon polymerization technique (2PP or TPA). Thus, according to the invention, light wavelengths and intensities are used which are not sufficient to initiate two-photon polymerization processes, so that the invention is explicitly not directed to the production of shaped bodies by means of two- or multi-photon polymerization (TPA) and this process is to be excluded from the scope of protection. The TPA structuring process differs fundamentally from the process which is to be used according to the invention, since it allows the solidification of any spatial element ("voxel") within the bath without the exposure beam solidifying the material it penetrates on its way to this element. Compared to single-photon polymerization, this requires radiation of twice the wavelength. While this is a great advantage for a number of applications, it has the disadvantage that TPA can only be used to solidify very small areas at once, because the exposure beam has to be guided serially over the areas to be solidified like a writing beam, which precludes a very fast mode of operation.

The present invention uses a process in which the body is produced by solidification of a liquid or viscous material, the solidification being effected by directing light from a radiation source onto a region of a surface of a substrate, there being located a layer of the liquid or viscous material which is subjected to organic polymerization by the action of radiation from this radiation source and is thereby solidified, whereupon further layers of the liquid or viscous material, each located on the layer of the last solidified material, are successively solidified with the aid of this radiation source.

The "light of a radiation source", as defined here, does not necessarily have to be in the visible range. UV light, for example, shall be included in this term.

Layers that are "on top of the layer of the last solidified material" are located on this layer when viewed in the direction of the radiation source. If, for example, the substrate is placed in a bath and the substrate surface is irradiated through a bottom of the bath container that is transparent to the light of the radiation source, the layers of the liquid or viscous material to be solidified are located below the substrate together with the layers already solidified thereon.

According to the invention, all techniques can be used which start from a liquid or viscous ("pasty"), i.e. flowable material which can be solidified by the action of light in a site-selective manner. Each layer is thereby exposed over its surface, i.e. usually with a fixed amount in z-direction and with any outline of the respective layer in x-y-direction. The respective area(s) of each layer can be exposed simultaneously (in this case, the exposure is a two-dimensional exposure), or it/they is/are scanned with a beam (the entire area is then exposed in narrow strips rather than simultaneously). This technique is called "printing" and belongs to the group of 3D printing processes.

Figure 2:
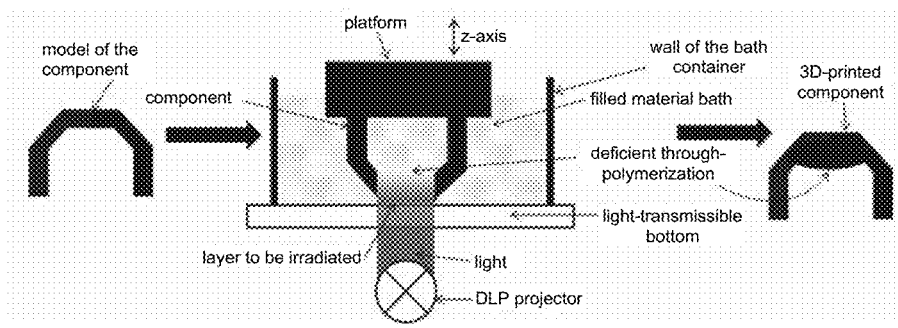
FIG. 2 illustrates the pressure of such a component and the formation of the FD.
Figure 3:
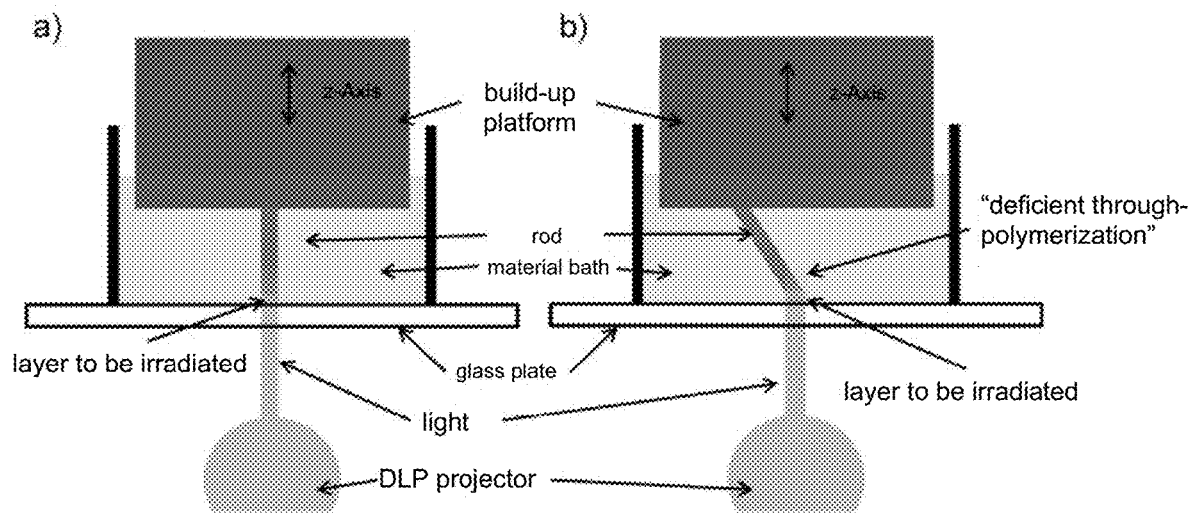
FIG. 3 illustrates the production of rods of different orientations by means of the technique according to the invention and the partly connected problems of the FD.

According to the invention, the so-called DLP (Digital Light Processing) is particularly suitable for the production of shaped parts. This is a material-saving, automated and thus fast and cost-effective process in which the material is located inside a bath, i.e. in a bath container. A substrate in the form of a platform, which can be moved in z-direction, is placed in the bath in such a way that between the bottom of the bath container and the downward facing surface of the platform or the already solidified layers there is a thin layer of the bath material, which can be exposed and solidified, whereupon the platform is moved and finally pulled up by a layer thickness in z-direction, so that bath material flows into the resulting gap. Each solidified layer usually has a constant thickness in the z-direction, but under certain circumstances it can be infinitesimally small, as explained in detail below. In the x-y direction, however, it can have any shape (also multi-part) or outline, which means that the resulting shaped body can also have e.g. undercuts or individual columns. Also several individual shaped bodies can be formed simultaneously. Solidification at the bottom of the bath is achieved by irradiating the bath material through the translucent bottom (or a translucent part of it) or a translucent wall of the bath tank. Either a writing beam can be used, so that individual parts of the surface are "scanned", i.e. exposed in narrow strips one after the other, or the exposure can be done at once (simultaneously) over the whole surface, which is thus exposed simultaneously. The latter is preferred because the area exposure is much faster. Exposure wavelengths are those with which a single-photon polymerization reaction can be effected, e.g. in the range of 320-480 nm. Exemplary sketches explaining the exposure path and platform movement are shown in FIGS. 2 and 3.

The DLP printer used may have a vibration system that allows periodic excitation of the material tray. Frequencies of preferably 100 Hz to 40 kHz are possible. The excitation can, for example, be pulsating or in interval mode. This reduces the viscosity when using non-Newtonian material systems. These systems can be particularly useful for composites with higher filler content.

The DLP printer used in the present invention may additionally have a modified tank system with translational displacement capability, e.g. a tank with several chambers, for example a three-chamber tank. A multi-chamber tank can be used for the alternating use of different printing materials or the use of a tank for washing the components before changing the material.

The process according to the invention can then have the following characteristics:

A method of producing a shaped body by means of a radiation-induced printing process comprising the following steps in the order given:

Layer build-up step in a tank 1:
provision of a substrate,
provision of a flowable starting material described in the present invention,
provision of a bath in which the substrate is immersed in the flowable starting material,
solidification of the flowable starting material on the surface of the substrate to produce a coated substrate,
removal of the coated substrate.

Wash step in a tank 2:
preparation of the coated substrate,
washing of the coated substrate, optionally using a vibration system for more effective cleaning, and
remove the washed coated substrate.

The washed coated substrate can then be used as the substrate in a further coating build-up step in tank 1. Alternatively, the washed coated substrate can be used as the substrate in a layer build-up step in tank 3, whereby the flowable starting materials in tank 3 and tank 1 differ from each other. For further layer build-up steps, additional wells with other flowable starting materials can be used.

The cycle consisting of the layer build-up step and washing step can be repeated until the desired shaped body is formed.

In a preferred configuration, the DLP printer has a vibration system and at least two trays, at least one of which is designed to be capable of performing a layering step and at least one of which is designed to be capable of performing a washing step.

In addition, a material feed system can be used that enables multi-component printing with a gradient in the z-direction. A system for tempering the printing material, preferably up to 70° C., can be used to reduce the viscosity, especially for composites with a higher filler content. For high-resolution components, a pixel size of 39 to 63 µm, preferably 20 to 30 µm, can be used.

When using a single-chamber trough, a doctor blade system can be used to improve the distribution of the printing material, especially with high viscosity systems.

The DLP printer and printing method may have the following features: Wavelength: 280 to 800 nm, preferably about 385 nm or about 405 nm; Irradiance: 0.6-40 mW/cm$^2$; Vat Deflection Feedback System: laser sensor technology for monitoring the printing process; tank made of optical highly transparent silicone for highest precision+tank with glass/film combination for highly viscous materials; layer thicknesses: 10-300 µm; recording of the sensor measurement data; application of a substrate on the stamp is possible A further development of the DLP process is the so-called CLIP process (Continuous Liquid Interface Production). Here, the bottom of the bath through which the radiation of the exposure source falls is preferably oxygen permeable. This prevents polymerization in the immediate vicinity of the bath bottom (the oxygen-inhibiting layer adjacent to the bottom usually has a thickness of approx. 20-30 µm) and eliminates the separate and relatively time-consuming step of controlled reflux of liquid/viscose material into the narrow gap, which is otherwise necessary with DLP and is intended for the polymerization of the next layer. The exposure can therefore be continuous while the platform is continuously pulled upwards (in z-direction). This of course has the consequence that no individual layers with measurable thickness in z-direction are formed. Nevertheless, the process is a variant of printing in layers, since the solidification takes place simultaneously in each x-y plane. In this sense, the term "layer" should therefore, according to the invention, also include layers of infinitesimal thickness.

In general, according to the invention, printing methods are preferred where the pressure is applied within a bath of the material to be solidified. Among these, the aforementioned DLP process, including the CLIP variant, is particularly preferred. Both the DLP process and the CLIP version can be combined with all the other aspects of the invention listed below.

Another example of 3D printing is stereolithography (SLA) in the strictest sense, where the shaped part is formed by placing a substrate just below the surface of a bath or, alternatively, near a translucent bath floor, in such a way that only a thin layer of material lies above/below it. This is solidified (scanned) with the help of a laser according to a previously developed digital form, whereupon the carrier is lowered/raised until the solidified layer is covered by another liquid layer, or until another liquid layer passes between the solidified layer and the bath bottom. This layer is then also solidified with the laser beam. Each layer has a fixed thickness (thickness) in z-direction, but can have any shape in x-y-direction, so that a shaped body can also be produced with undercuts, for example. Other processes that can be used according to the invention are the so-called µ-Stereolithography (µ-SLA), Multi Jet Modelling (MJM) and Poly Jet Printing (PJP) as well as variations of some of these processes, in which e.g. squeegee systems are used, e.g. Lithography-based Ceramic Manufacturing (LCM), or where film systems are used, e.g. Film Transfer Imaging (FTI) (e.g. Admaflex Technology), or other process variations, e.g. the TwoCure process or Mask Stereolithography (MSLA) For the MJM and PJP, a liquid, photosensitive material is applied layer by layer to a platform via a print head, and each deposited strand (which, in the sense of the invention, is to be regarded as part of a layer) is immediately cured by a light source integrated e.g. in the print head. (This is an example of a technique in which the respective layer is not exposed simultaneously, but in narrow stripes, which corresponds to the above-mentioned "scanning"). To produce overhanging structures, several print heads are used to create support structures, which must be mechanically removed or washed out after printing. In the Film Transfer Imaging process, the light-sensitive material is applied to a platform via a transport foil and cured e.g. layer by layer by means of a projector. This process is especially suitable for highly viscous materials. The same applies to Film Transfer Imaging using the Admaflex technology, in which the material to be cured is also fed via a film. In contrast, the LCM works with a doctor blade. The material trough rotates in a circle after each layer is consolidated, so that new material is applied to the bottom of the trough with the squeegee. Otherwise, there is great similarity to the DLP principle. Higher viscosity materials are also favourable for this process. The TwoCure process uses photochemical cross-linking as well as solidification with cold. Cold, waxy, but not chemically solidified material, which serves as a support, can then be liquefied at room temperature after printing. Finally, there is mask stereolithography, in which, as in DLP, a building platform protrudes into a material bath and the irradiation takes place from below through the bottom of the bath, which is permeable to radiation. In contrast to DLP, however, the exposure field is not generated by a DLP chip but by a liquid crystal exposure mask.

If DLP technology is used for the process according to the invention, the material is solidified inside the bath so that surface effects such as oxygen-induced inhibition of the polymerization reaction can be avoided. A smaller material supply is also required compared to systems in which the building platform enters the material bath and is exposed from above. The latter technique also often requires a wiper or squeegee to create a smooth surface.

The term "multitude of layers" means that the shaped body is made up of very many layers (theoretically even infinitely many, if the CLIP process is used). The actual number depends on the structure and size of the shaped body and the selected layer thickness; the layer thickness usually varies between 10 and 150 µm, but may be even less if necessary. The size of the shaped bodies will usually be in the mm or cm range, with possible deviations upwards or downwards.

The expressions "shaped body", "body" and "part" are used synonymously herein.

The expressions "layer thickness" and "layer thickness" are used synonymously herein.

The expressions "matrix", "resin matrix" and "matrix system" are used synonymously herein.

The expressions "absorber", "light absorber", "photo absorber" and "UV absorber" are used synonymously herein.

The terms "3D printing process" and "3D process" are used synonymously herein.

By "liquid or viscous material", the invention means a material which is in any case still capable of flowing. However, the flowability may also be relatively low.

The term "(meth)acrylic" shall include acrylic and methacrylic.

The process according to the invention uses material formulations in liquid or viscous form which contain a polysiloxane component (a condensed silane-based system, also known as silica polycondensate or, in the presence of other heteroelements, silica-heteropolycondensate) based on monomeric silanes containing two or three hydrolysable groups. The silanes are functionalized with groups that can polymerize with each other under the influence of light, for example with (meth)acrylic or cycloolefinic groups, such as norbornenyl groups, or with rings that open up during a light-induced polymerization reaction, such as e.g. revealed in DE 4011044, DE 19627198, DE 19910895, DE 10349766.8, DE 102005018059, DE 4125201.2, DE 4125201.2, DE 102011054440 A1, DE 102011053865 A1, DE 102012109685 A1, DE 102013108594 and DE 10201415751 A1 The polysiloxane component usable according to the invention may contain additional groups, if necessary, which have been obtained e.g. by incorporation of corresponding, possibly additional silanes. An example is the presence of aryl groups, the effect of which is described below. As known from DE 102013108594, these can be incorporated e.g. by reacting a part of the (meth)acrylic groups of a corresponding silane resin with a thioaryl compound such as thiophenol. Another example is the presence of phosphorus-containing groups such as phosphonic acid, phosphinic acid or phosphate groups on radicals bonded to silicon atoms via carbon. These are known from DE 10111955, for example. It is possible that such a group (or several of them) is present on a radical that is bonded to silicon via carbon and that also carries one or more acrylate and/or methacrylate groups, see the above-mentioned publication. Another alternative is the presence of oxidized sulfur-containing groups such as sulfinate, sulfonate or sulfate groups or the corresponding acids on a radical bonded to silicon via carbon. In this respect, reference can be made to DE 102011050672. It is possible that all mentioned groups are located on a residue bonded to silicon via carbon, which additionally carries other reactive groups. Examples are acrylate, methacrylate, carboxylic acid or hydroxy groups. According to the invention, it is possible to use a resin system that contains either aryl groups or phosphorus-containing groups or oxidized sulfur-containing groups as defined above. However, combinations of two of the three options or a combination of all three options can also be used. The effects resulting from the respective additives or the combination of several additives are described below.

However, the silica polycondensates usable according to the invention must not be based on silanes which are functionalized with groups which can polymerize with each other under the influence of radiation, as defined above, and which have only one hydrolyzable group.

The material of the present invention solidified by organic polymerization is in the present case often referred to as "hybrid polymer" to express that it is cross-linked both inorganically—via Si—O—Si bridges—and organically—by the polymerization of the polymerizable groups.

In addition to silicon, the hybrid polymers or the corresponding starting materials, i.e. the polysiloxane component or the silica (hetero)polycondensate may contain heteroelements such as B, Al, Zr, Zn, Ti and the like to a lesser extent, as known from the state of the art. These can be incorporated into the polycondensate by adding e.g. the corresponding alkoxides. The term "silica (hetero)polycondensate" shall include both silica polycondensates (with or without foreign heteroelements) and silica heteropolycondensates containing foreign heteroelements.

The addition of purely organic crosslinkers, which may copolymerize with or add to the more polymerizable groups, is also not excluded, but is generally not intended. Furthermore, depending on requirements, these material formulations also include additives that are required for shaping when using 3D printing technologies based on the principle of light-curing materials, in particular the Digital Light Processing (DLP) principle, in particular an initiator for the radiation-induced polymerization reaction. Other additives can be added as needed.

Inorganic, organic and hybrid polymer-based fillers can also be included. Blends containing at least inorganic-organic hybrid polymers and fillers are also called composites. The polysiloxane component and the compounds dissolved therein act as a matrix in which the fillers are dispersed. The fillers may be primary particles in the nanometer range, which, as the invention explains further below, may be agglomerated or (completely) dispersed into larger particles as required and may exhibit surprising effects, such as the modification of the refractive index of the matrix system. Instead or additionally larger particles can be added, e.g. to modify the mechanical and tribological properties. Inorganic splintered or spherical fillers are preferred, but fibrous fillers can also be used. Dental glass powders with particle sizes between 0.18 μm and 5 μm are particularly preferred as splinter-shaped fillers. As spherical fillers, $SiO_2$, $TiO_2$, ZnO, ZnS and $ZrO_2$ nanoparticles with particle sizes between 5 nm and 100 nm are particularly preferred. Examples of fillers that can be used are also described in EP 3 090 722 A1 (see pages 9 and 10) as well as in DE 1964378, DE 10018405, DE 102011053865 A1 and DE 102005061965.7. To improve the bond between the filler particles and the crosslinked matrix, the fillers in a first variant of the composites may be surface modified. Preferably, the surface modification carries groups that can be polymerized into the organic network of the silica polycondensate. An example is the surface modification with methacryloxypropyl trimethoxy silane, see EP 3 090 722 A1 (p. 10), if the polysiloxane component of the bath material has methacrylic groups or other groups copolymerizable with methacrylic groups as organically polymerizable residues. The surface modification results in improved dispersion of the particles. If the particles are nanoparticles (below a certain particle size), they no longer scatter light, but modify the refractive index of the matrix of which they have become part. In a second variant of composites, a polysiloxane component is used in the matrix, which contains phosphonic acid, phosphinic acid, sulfonic acid, sulfinic acid or carboxylic acid groups (or mixtures thereof), as mentioned above. The acid functions mentioned above also stabilize very small, non-surface-modified particles in dispersed form in the resin matrix. Only small amounts of the groups mentioned are required for this purpose.

The material formulations are used for the process according to the invention in a flowable state. If composites are used, it has been shown in accordance with the invention that their fillers can be present in proportions of up to 60 wt % or even more without substantially impairing the process. This is because the invention was able to show that these composites can also be brought into flowable form without problems in at least some of the printing processes that can be used, so that they are suitable for the forming method to be used according to the invention.

As already mentioned, the material formulations contain at least one suitable additive for the initiation of radical photopolymerization by light. Examples of suitable additives are phosphine oxides. 2,4,6-trimethylbenzoyl diphenylphosphine oxide (LTPO) is the preferred additive. Phosphine oxides such as 2,4,6-trimethylbenzoyl diphenylphosphine oxide have the advantage over other initiators such as DL-camphorquinone that they do not require the addition of an amine activator such as ethyl 4-dimethylaminobenzoate. The system is also not yellowish.

Mixtures of different initiators can also be used to advantage. Examples of such initiators can be found in EP 3 090 722 A1.

After 3D printing, post-processing steps can be performed, such as washing the components with solvent, preferably isopropanol, in an ultrasonic bath and post-curing, for example thermally or photo-induced.

If the 3D-printed part is to be post-cured by heat, it is also recommended that a suitable additive be added to initiate the additional thermal polymerization, with the photoinitiator being used for pre-curing during 3D printing and the thermal initiator for post-curing afterwards. This can be done, for example, in an oven and/or by means of IR lamps and/or microwave. Peroxides such as dibenzoyl peroxide (DBPO) can be used as thermal radical initiators. If required, a combination of different photoinitiators can also be used, which have their absorption maximum at different wavelengths. Post-cure with light is also possible, but it is advantageous to use two photoinitiators with absorption ranges that are matched so that one photoinitiator splits during 3D printing and the other post-cures with light at a wavelength different from the emission wavelength of the printers LED. An example of such a combination is the use of LTPO as an initiator for 3D printing (effective from about 420/410 nm and below) and camphor quinone, effective in a wavelength range of about 400-500 nm, for post-curing. Alternatively, a UV initiator can be used as a second initiator for post-curing. Post-curing with light can be photoinitiated e.g. with a flash light unit (e.g. G 171 Otoflash from NK Optik, Baierbrunn (D)). (optionally under inert gas) and/or Spectramat (e.g. a dental light furnace from Ivoclar, Schaan (Lichtenstein)) and/or dental spotlight (Polofil® Lux from Voco GmbH, Cuxhaven) and/or high-intensity LED spotlight (Bluepoint LED eco from Honle, Grafelfing/Munich)

The inventors found that the mechanical properties of the 3D-printed shaped bodies were better than those of shaped bodies that had been produced by conventional production using mold casting and exposure to a dental radiator (Polofil® Lux from Voco GmbH, Cuxhaven). Surprisingly, it turned out that shaped bodies produced by the method according to the invention can have a bending strength that even exceeds that of conventionally produced shaped bodies by more than 10 MPa (example: 3D-printed 102 MPa and conventionally produced 91 MPa). In the tests conducted, bending strengths of up to 150 MPa, sufficient for permanent dentures such as single crowns, and moduli of elasticity of up to 5.5 GPa could be achieved with suitable filler additives. In general, shaped bodies with a wide range of E-modulus can be printed. The E-modulus can thus be specifically adapted to the requirements of the body. This adaptation is possible both through the structure of the matrix and through the use of fillers. Surprisingly, components with isotropic mechanical properties over a wide range can be produced.

In particular, the procedure according to the invention, with the appropriate choice of matrix structure and/or fillers, allows the printed components to look like natural teeth, i.e., to achieve excellent esthetics and translucency (up to 75% and beyond and thus more than is normally required for dental technology purposes). Especially by using suitable nanoparticles, the refractive index of the matrix can be raised or lowered and thus adapted to the refractive index of the larger particles used to fine-tune the translucency of the material systems. This enables the printing of patient-specific components. In addition, the matrix systems used for the procedure according to the invention are a biocompatible, toxicologically harmless material base, which makes their use in the dental field unproblematic. At the same time, the surface of the manufactured components can be made smooth and virtually step-free (often barely visible even with an optical microscope) by choosing a high resolution, which leads to good plaque resistance. If necessary, post-curing steps can be carried out to ensure that this surface is also tack-free.

As mentioned above, high mechanical properties of the individual 3D-printed components can be achieved and the Young's modulus can be adjusted for different applications. In particular, the mechanically necessary values for shaped parts can be achieved, which are necessary for a permanent restoration with a single dental crown. Furthermore, the components can have an appearance adapted to the natural tooth. If the refractive indices of the matrix or matrix system including dispersed nanoparticles and fillers are close to each other, excellent esthetics/translucency can be achieved, while at the same time the values for flexural strength and modulus of elasticity can be very high.

The adjustment of the refractive indices of matrix and filler is achieved by increasing the refractive index of the matrix, which is usually lower than that of the filler. For this purpose, the matrix can be modified by adding an aromatic, e.g. phenyl-containing group, as indicated above. Examples of matrices with such groups are the base resins 1 b, 1c, 1 d and 1e, 3 and 4.

Alternatively or additionally, an increase in the refractive index of the matrix can also be achieved by adding fillers with a higher refractive index and with a very small diameter (in the nm range; so-called nanoparticles), if it is possible to disperse these fillers as primary particles in the matrix. In general, the mechanical values of the material are only slightly affected by this measure, as can be seen from the examples below. The matrix system with an increased refractive index can then be combined with suitable fillers with a similar refractive index in order to achieve improved mechanical properties while retaining the translucency.

Certain particles such as $ZrO_2$ and $TiO_2$ have the additional ability to absorb energy in the form of light, e.g. by raising an electron from the valence band to the conduction band (formation of an electron-hole pair). Subsequently, e.g. a recombination takes place again.

Thus they also act as light absorbers. In this respect, it can be referred to G. Wypych, Handbook of UV Degradation and Stabilization, ChemTec Publishing, Toronto 2015, p. 45. There, the effect is demonstrated using $TiO_2$ and $ZnO$ nanoparticles.

If the method of increasing the refractive index of the resin matrix is chosen by incorporating inorganic nanoparticles, the addition of aromatic groups may be unnecessary. This may be advantageous because aromatic components may be degraded to compounds with estrogenic effects (e.g. bisphenol-A), which should of course be avoided for health reasons.

It should be noted that the refractive index of the resin matrix usually increases during solidification. This must be taken into account when calculating the materials to be used.

Furthermore, the material for the components according to the invention has only low polymerization shrinkage (basic resin system 1 shows a volume shrinkage of only 5.2 when light-cured), which is particularly advantageous for layer-by-layer curing during production using a 3D printing process due to the lower distortion of the polymerized layers in the lateral plane. As a result, high-resolution components with good surface quality can be produced.

If necessary, the material used for printing can be functionalized with other suitable groups, e.g. those that give the product properties suitable for the intended use. Examples are groups that enable good bonding of an additional layer or repair material, as known from EP 2 846 757 A1, for example.

In a special embodiment of the invention there is the possibility of multi-component printing in the z-direction. This can be achieved, for example, by continuously feeding a second material into the material trough during the construction process. In this way, a material gradient in z-direction can be created. In addition, for better printability, the viscosity of the materials themselves can be adjusted by the matrix and the fillers and/or for a temporarily lower viscosity of the materials during printing, the material tray can be tempered with a heating element.

The process, which is in accordance with the invention, allows not only simple geometries but also complex components with overhangs to be printed. For this purpose, various inorganic or organic additives or additive combinations can be added as required in a specific embodiment of the invention, which can be combined with all other embodiments. These are explained in more detail below Thus, for the realization of complex component geometries, e.g. components with overhanging structures, suitable light stabilizers (substances which absorb in the range of the radiation used) can be used as additives. This may be necessary, or at least helpful, especially in the case of translucent materials, since the dimensional stability of the layers during printing, especially in the z-direction, can be significantly improved as a result, which can be seen more precisely from the design examples. Light stabilizers include light absorbers and optical brighteners, for example. In a special variant of this specific design, the radiation-absorbing additives are those that are fluorescence-active (i.e., in addition to their function as absorbers, they can also act as optical brighteners). Such materials can absorb UV/visible light and re-emit it in visible light (fluorescence). The emission of blue light increases the color saturation. Yellow tones can also be masked with it. For dental indirect/direct restorative materials and prophylactic materials (e.g. fissure sealants), fluorescence is favorable in many cases, e.g. because it allows artificial materials used in the mouth to be recognized/detected under light (X-rays can be avoided). Furthermore, it is possible to generate a fluorescence behavior comparable to that of natural tooth structure (see also I. K. Lutskaya, N. V. Novak et al, Fluorescence of tooth structure and filling materials, ZMK, 2011, vol. 27, issue 12).

In addition, depending on the material system, printing parameters such as exposure time, layer thickness, travel speed in z-direction, waiting times (before and after exposure), pressing force, separating force or separating distance can be adapted in a suitable way to the respective material system and the desired component properties.

In all cases, unfilled to highly filled materials can be used. Depending on the requirements, light stabilizers, especially inorganic and organic light absorbers and optical brighteners, can be added to the compositions used according to the invention.

In this way, the problems known in the literature, which arise in connection with so-called "overcuring", can be counteracted and overhanging structures can be printed with dimensional accuracy. For example, components in the form of bridges or the like are printed (=components with overhangs) and the thickness of the overhangs is measured and compared with the desired thickness. The present invention also provides a method for determining the "overcuring".

The invention enables the printing of components made of opaque or translucent materials with good shape accuracy, dimensional accuracy, dimensional stability and dimensional precision in all directions, especially—e.g. in the case of overhanging parts—also in the z-axis. Simple and also complicated 3D structures with unfilled or low to highly filled materials can be used as required.

With the process according to the invention, it is possible to match the viscosity, biocompatibility as well as the mechanical and optical properties of the materials in a suitable manner and to reduce or avoid "overcuring" even in complex components, as explained in more detail below.

The invention proposes for the process according to the invention and the shaped bodies producible therewith a material base with a suitable constellation or a suitable interaction of all required material properties, such as viscosity, aesthetics, biocompatibility and the mechanical and abrasive properties, as required for the most realistic imitation of teeth or for the production of dental prostheses, in particular for the production of systems with high bending strength, modulus of elasticity and abrasion resistance. The invention is also suitable for the manufacture of fissure sealants, which according to the invention are also to be understood as "shaped bodies". In addition, the process according to the invention can be used to produce shaped bodies which are suitable as splints for tooth correction, tooth protection/mouthguards, e.g. for athletes, snoring splints, bite splints or creak splints. The materials that can be used according to the invention have suitable viscosities for 3D printing that can be used according to the invention, especially digital light processing. The materials can be printed even with a high filler content and thus increased viscosity with high surface accuracy and resolution.

Accordingly, the invention-based process can be used to produce shaped bodies from a starting material whose viscosity is well suited to the proposed printing processes. The shaped bodies themselves can have a high translucency and good mechanical properties. Such shaped bodies can be used very well, e.g. as single crowns in the dental field, since they have suitable optical and biocompatible properties in addition to the necessary mechanical ones.

In the following, the invention is to be explained in more detail on the basis of more general and more concrete statements as well as examples of execution, without any restrictions being imposed.

1. Concretely Used Printing Device

The S60 LED 3D printer from Rapidshape (Digital Light Processing) was used for all 3D printed parts. The light-curing resin is placed in a bath container with a translucent bottom. Light from a suitable light source passes through the bottom of the bath into the material bath in the bath container. The exposure profile is generated by means of a DLP chip containing many micro mirrors. These can be individually controlled and by tilting them, the light can be directed either into or out of the projection plane to generate the desired exposure profile. A platform can be lowered into the bath in z-direction by means of a motor and from there it can be moved upwards in layers. The formation of the shaped body begins with the solidification of the narrow area in z-direction between the bottom of the bath and the bottom of the platform. After the solidification of this area, the platform is first raised to a certain so-called separation distance, so that further resin material gets between the solidified area and the bath bottom. The platform then moves down again a little so that the distance between the bottom of the bath and the solidified part is exactly the same as the desired layer thickness. In a second step, this resin material is solidified. This step is repeated until the component is finished. For each layer, the exposure profile in x-y dimensions is selected in a suitable manner. This process can also result in undercuts in that subsequent layers have a larger x-y dimension than preceding ones.

Exposure in the 3D printing process in the examples was done at wavelengths near the borderline between visible light and UV light, especially at about 382 nm, an intensity of about 6.15 W/m² and a duration of 3 to 50 s, typically about 5 to 24 s. Layer thicknesses of 25, 35, 50 and 100 μm were printed.

2. Resin Systems Used for the Polysiloxane Component ("Basic Resin Systems")

a) Basic resin system 1 (see DE 44 16 857)

Triphenylphosphine as catalyst, BHT as stabilizer and 47.35 g (0.550 mol) of methacrylic acid are added to 125.0 g (0.503 mol) of 3-glycidyloxypropyl diethoxymethyl silane under dry atmosphere and stirring is carried out at 80° C. (approx. 24 h). The reaction can be followed by NMR. After addition of acetic ester and H₂O for hydrolysis with HCl as catalyst is stirred at 30° C. After stirring for several days, the preparation is carried out by extracting with aqueous NaOH and water and filtration through hydrophobic filters. It is first rotated off and then removed with oil pump vacuum. The result is a liquid resin with a viscosity of 3-5 Pa·s at 25° C. and a refractive index $n_D$≈1.477.

b) Basic resin system 1a (see DE 102013108594)

Basic resin system 1 contains a free hydroxy group on the residue, which also carries the methacrylate group. This can be reacted with varying amounts of thiophenol, which attacks the methacrylate group according to the thiol-ene mechanism.

22.3 g (0.203 mol) thiophenol are added to 119.7 g (0.45 mol) of basic resin system 1 under stirring. This results in a liquid resin with a viscosity of approx. 7 Pa·s at 25° C. and a refractive index $n_D$ of approx. 1.508. Further processing is not required.

c) Basic resin system 1b (see DE 102013108594)

6.21 g (0.04 mol) methacrylic acid isocyanatoethyl ester (0.8 mol per mol methacrylate-substituted radical with and without reaction with thiophenol) are added to 15.4 g basic resin system 1a and 0.043 g BHT (2,6-di-tert-butyl-4-methylphenol) under dry atmosphere at 30° C. with stirring, and stirring is continued at 30° C. The result is a liquid resin with a viscosity of approx. 36 Pa·s at 25° C. and a refractive index $n_D$ of approx. 1.502. Further processing is not necessary.

A comparable system can also be produced by adding the components thiophenol and methacrylic acid isocyanatoethyl ester in the wrong order. If this route is chosen, the SH group can be added to both the methacrylate group of the basic resin system 1 and the methacrylate group of the added isocyanate compound. The basic resin system thus produced is therefore not identical to the product of the former addition sequence.

d) Basic resin system 1c (see DE 102013108594)

The production of basic resin system 1 b was repeated with the change that instead of thiophenol the corresponding molar amount of 4-methylthiophenol was used.

e) Basic resin system 1d (see DE 103 49 766.8)

(a) 13.52 g (0.15 mol) acrylic acid chloride is added to 78.15 g (0.30 mol) of basic resin system 1 and 16.70 g triethylamine (0.55 mol) in 300 ml THF under dry atmosphere and cooled by means of an ice bath while stirring and continued at room temperature. After the usual processing to separate the amine hydrochloride and acidic by-products resulting from the addition and removal of the volatile components with oil pump vacuum, a liquid resin with a viscosity of approx. 2.7 Pa·s at 25° C. is obtained.

(b) (see DE 102013108594) 0.0654 g (0.5266 mmol) 4-methylthiophenol is added to 0.3740 g (1.3165 mmol) of basic resin system 1e (a) dissolved in 5 ml THF under stirring, and stirring is carried out at RT (approx. 24 h). It is first rotated off and then removed with oil pump vacuum. The result is a liquid resin.

f) Basic resin system 2 (see DE 103 49 766.8)

54.3 g (0.7 mol) methacrylic acid isocyanatoethyl ester is added to 130.3 g (0.5 mol) of basic resin system 1 under dry atmosphere at 30° C. while stirring, and stirring is carried out further at 30° C. After isocyanate conversion, 0.092 g BHT is added. The result is a liquid resin with a viscosity of approx. 28-34 Pa·s at 25° C.

g) Basic resin system 3

(a) Precursor synthesis: 85.69 g (0.40 mol) glycerol-1,3-methacrylate-acrylate, 0.172 g BHT, 0.448 g triethylenediamine and 41.2 g (0.41 mol) succinic anhydride were dissolved in 86 ml THF and stirring is carried out at approx. 62° C. for approx. 24 h. The reaction can be followed by NMR. Processing is performed by extracting with H₂O, subsequent addition of acetic ester and filtration through hydrophobic filters. It is first rotated off and then removed with oil pump vacuum. The result is the liquid precursor.

(b) Synthesis of precursor (see DE 44 16 857): 10.68 g (0.034 mol) Precursor 3 (a) are added to 42.23 g (0.17 mol) 3-glycidyloxypropyl diethoxymethyl silane, 0.1 wt % BHT and 0.357 g triphenylphosphine by dropping while stirring at approx. 82° C. After approx. 4 h, 13.17 g (0.153 mol) methacrylic acid are added and stirred at 82° C. for approx. 40 h. The reaction can be followed by NMR. After addition of acetic ester and H₂O for hydrolysis with HCl as catalyst is stirred at 30° C. After stirring for approx. 48 h, processing is carried out by extracting with aqueous NaOH and water and filtration through hydrophobic filters. It is first rotated off and then removed with oil pump vacuum. The result is a liquid resin with a viscosity of ≈8 Pa·s at 25° C. and a refractive index $n_D$≈1.481.

(c) Conversion to basic resin system 3: The addition of methylthiophenol to 3 (b) is carried out according to 2e) (b), resulting in a liquid product.

h) Basic resin system 4 (see EP 0451709; EP 0450624)

Synthesis of precursor: 10.08 g (46.4 mmol) 3-isocyanatopropylmethyldiethoxysilane are added to 9.95 g (46.4 mmol) glycerol 1,3-methacrylate acrylate and 0.029 g dibutyltin dilaurate while stirring at RT, and stirring is carried out until reaction at RT. After addition of acetic ester (1000 ml/mol silane) and H₂O for hydrolysis with HCl as catalyst stirring is carried out at 30° C. After stirring for approx. 48 h, the preparation is extracted with aqueous NaOH and water and then filtrated through hydrophobic filters. 0.04 wt % BHT is added. It is first rotated off and then removed with oil pump vacuum. The result is a liquid resin with a viscosity of =89 Pa·s at 25° C. and a refractive index $n_D{\approx}1.486$.

Conversion to basic resin system 4: The addition of methylhiophenol takes place according to 2e) (b), resulting in a liquid product.

3. Mechanical Investigations of Unfilled Resin Systems

For the flexural strength and modulus of elasticity, 10 samples were always tested; the values given represent the average of these.

3.1. Comparison of the Mechanical Data of Specimens Produced According to the Invention with Those Produced Conventionally For this purpose, 2 wt % dibenzoyl peroxide (DBPO) was dissolved in basic resin system 1 at 40° C. Subsequently, 1 wt % 2,4,6-trimethylbenzoyldiphenylphosphine oxide (LTPO) was dissolved in the mixture at 34° C. Then, specimens with specific dimensions were prepared in three different ways as indicated below (the methods of preparation are also referred to in the following sections of the text, although the exposure times and layer thicknesses of method III partly differ from those used for these initial investigations, which is then indicated in each case):

I. Conventional mold casting with light curing: The resin material was placed in molds, and polymerization, and thus formation of the specimens, took place, unless otherwise indicated, by exposure to visible light of a wide range of spectrum twice for 100 s each with the Polofil® Lux dental lamp from Voco GmbH, Cuxhaven (once from the top and once from the bottom). The specimen bodies had dimensions of 2 mm×2 mm×25 mm.

II. Conventional mould casting with thermal curing: The resin material was placed in moulds, and polymerisation and thus formation of the specimens was achieved by a 4-hour thermal curing at 100° C. The specimens had dimensions of 2 mm×2 mm×25 mm.

III. 3D printing used in accordance with the invention: The specimens were printed with different layer thicknesses (for section 3.1. at 100 μm) and exposure times (for section 3.1 at 24 s per layer) at a light intensity of approx. 6.15 W/m² and a wavelength of approx. 382 nm, then washed in isopropanol for 60 s in an ultrasonic bath, blown off with compressed air, dried for 5 min at 23° C. for residual evaporation of the solvent and post-cured in the oven at 100° C. for 2 h. The specimens had dimensions of 2 mm×2 mm×27 mm and were printed with the specimens perpendicular to the building platform, i.e. 27 mm pointed in the z-direction.

Afterwards, the resulting specimen shapes were ground and then stored in a dry place at 40° C. for 24 h. The subsequent 3-point bending tests were performed in accordance with the DIN EN ISO 4049: 2009 test standard using the Z100 universal testing machine from Zwick/Roell (Zwick GmbH & Co. KG, Ulm), with the change that instead of water storage, dry storage was used and the feed rate was 3 mm/min. The Young's modulus was determined in the linear range of the stress-strain curve between 10-20 MPa over the secant.

Result:

|  | Flexural strength [MPa] | Young's modulus [GPa] |
|---|---|---|
| I. Light Curing | 91 | 2.1 |
| II. Thermal curing | 89 | 2.2 |
| III. 3D printing (100 μm; 24 s) | 102 | 2.2 |

Results show that using 3D printing instead of light or thermal curing significantly improves flexural strength (by at least 11 MPa or more than 10%!) even in relatively thick layers of 100 μm.

A comparison with the values given in DE 10 2014 116 402 A1 shows the following: There, four different polysiloxane resins, each of which had been hydrolytically condensed with and without the addition of a disilane, were conventionally cured by exposure to light. Camphor quinone was used as photoinitiator (absorption maximum at approx. 470 nm) together with ethyl p-N,N-dimethylaminobenzoate (DABE) as co-initiator (which is always required when camphor quinone is used). "Polysiloxane IV" corresponds to the basic resin system 1 of the present invention. The shaped bodies made from it had better flexural strength than those made from the other resins examined; nevertheless, the value of 25.7 MPa was significantly lower than the value found in the present invention. Even the addition of the largest amount of disilane used only brought an increase to 38.1 MPa, while the inventors of the present invention found a flexural strength of 91 MPa with a comparable cure. The reason for the different values is not immediately apparent; this may be due to incomplete curing, the use of other wavelengths and correspondingly different photoinitiators or other reasons. It is essential, however, that the inventors of DE 10 2014 116 402 A1, probably due to the weak results they found, did not carry out any further investigations on resin systems without disiloxanes, especially those with stereolithographically obtained products. Neither are any strength values given for stereolithographically produced shaped bodies made of resins with disiloxanes without added fillers. It is therefore completely unexpected that the flexural strength found in the present case for a shaped body formed from polysiloxane resin, which was produced using 3D printing with the aid of a photoinitiator, especially when exposed to light in the region of the limit of visible to UV, i.e. below 400 nm and without fillers, is significantly higher than that of a corresponding "conventionally" produced shaped body.

3.2 Dependence on the Exposure Time Per Layer

The basic resin system 1, mixed with 2 wt % DBPO and 1 wt % LTPO, was prepared as described under 3. 1. III. above with a layer thickness of 100 μm, whereby different exposure times per layer were selected.

Result:

| Exposure time [s] | Flexural strength [MPa] | Young's modulus [GPa] |
|---|---|---|
| 12 | 96 | 2.4 |
| 18 | 97 | 2.3 |
| 20 | 99 | 2.3 |
| 22 | 98 | 2.4 |
| 24 | 102 | 2.2 |
| 26 | 98 | 2.3 |

It can thus be shown that the bending strength and the modulus of elasticity are relatively independent of the exposure time per layer. It should also be noted that the required exposure time also depends on the intensity of the radiation used: If the intensity is varied, the exposure time should be adjusted accordingly, so that intensity×exposure time remain approximately constant. The exposure time also depends on the layer thickness used: If the layer thickness is varied, the exposure time should be adjusted accordingly.

3.3 Dependence on the Layer Thickness

The basic resin system 1, mixed with 2 wt % DBPO and 1 wt % LTPO, was prepared as described under 3. 1. III. above, with different layer thicknesses. The exposure time was adjusted accordingly.

Result:

| Layer thickness [µm] | Exposure time [s] | Flexural strength [MPa] | Young's modulus [GPa] |
|---|---|---|---|
| 100 | 24 | 102 | 2.2 |
| 50 | 12 | 95 | 2.2 |
| 35 | 8.4 | 94 | 2.3 |
| 25 | 6 | 96 | 2.2 |

Accordingly, the highest bending strength is achieved at a layer thickness of 100 µm, the highest modulus of elasticity at a layer thickness of 35 µm. Overall, however, it can be said that the differences between shaped bodies printed with different layer thicknesses are relatively small.

3.4 Investigations of Bending Strength of Rods Printed by the 3D Method

Rod-shaped (cuboid) test specimens of basic resin system 1 with 2 wt % DBPO, 1 wt % LTPO and 0.5 wt % $TiO_2$—NP were printed at different angles between 0 and 45° to the solder to the platform and to the bath bottom with a layer thickness of 100 µm and an exposure time of 9 s. An orientation of 0° corresponds to an orientation perpendicular to the platform. The bending strength of the finished test specimens is determined in all cases with force applied perpendicular to the side surface of the test specimens that was facing the building platform during manufacture.

| Alignment [°] | Flexural strength [MPa] | Young's modulus [GPa] |
|---|---|---|
| 0 | 85 | 2.2 |
| 15 | 87 | 2.1 |
| 30 | 87 | 2.2 |
| 45 | 85 | 2.2 |

It can be seen that the mechanical properties of the test specimens are independent of the orientation of the rods in relation to the building platform. This results in isotropic mechanical properties over a wide range of component orientation.

3.5 Dependence on the Alignment in the Installation Space

When manufacturing bodies, e.g. those with overhanging sloping surfaces, such as test specimens in the form of rods (cuboids with square base area), which are aligned at an angle to the building platform, and generally for components with overhangs/undercuts, a—literature-known—error can occur in some cases. In the case of materials with a high translucency in the uncured state, the light may not be completely absorbed by the layer to be exposed, but may be transmitted into the already printed layers, especially in the z-direction (so-called overcuring). This is not a problem for vertically printed rods (see FIG. 3), since the light is only transmitted into already cured layers. This is a problem for rods printed at an angle. Here, the light is guided back into the material bath, which triggers the polymerization of material there. This causes undesired curing of the material at these points, resulting in an accumulation of material. This effect is called "defective through-polymerization" (FD). The same effect is illustrated in FIG. 2 using another component geometry with overhang (=bridge). In general, the more translucent the material is, the greater this defect is.

Furthermore, the following phenomenon contributes to the shape accuracy in z-axis: In the uncured state, resins filled with filler have a certain difference in refractive index between matrix and filler. Since the refractive index of the matrix usually increases in the cured state, this refractive index difference changes (when $n_{D\text{-}filter} > n_{D\text{-}matrix}$, $\Delta n_D$ becomes smaller).

4. Development of a Method for the Determination of "Defective Through-Polymerization" (FD) and General Solution Possibilities According to the invention, defective through-polymerization (FD) is determined by means of special test specimens that have the largest possible and easily measurable overhang and can be printed quickly. See FIG. 6 in this regard: The test specimens used are those with at least two different sections delimited from one another parallel to the z-direction, where section A has at least one, preferably several consolidated layers that are formed starting from the surface of the platform, and section B has consolidated layers that do not extend to the building platform in the z-direction. The layers of section B may or may not be the last consolidated layer or several such layers in the process. They can have the shape of a single, thick layer or have several, thinner layers or lamellae (e.g., webs). At least one section of the specimens must have the last formed layers. This can be one of the sections A or B or a combination of both; however, there may just as well be a third section C, which additionally or exclusively contains the last printed layers.

This means that the parts are designed in such a way that when the printing is complete, a section B of the part, viewed in the z-direction, does not reach the building platform, so that a gap with uncured material (or with air if the part is no longer in the bath) remains between the cured side of section B and the building platform, which is "on top" during the process, or that gaps with uncured material or air remain between cured parts in this section B of the part, viewed in the z-direction.

Figure 1:
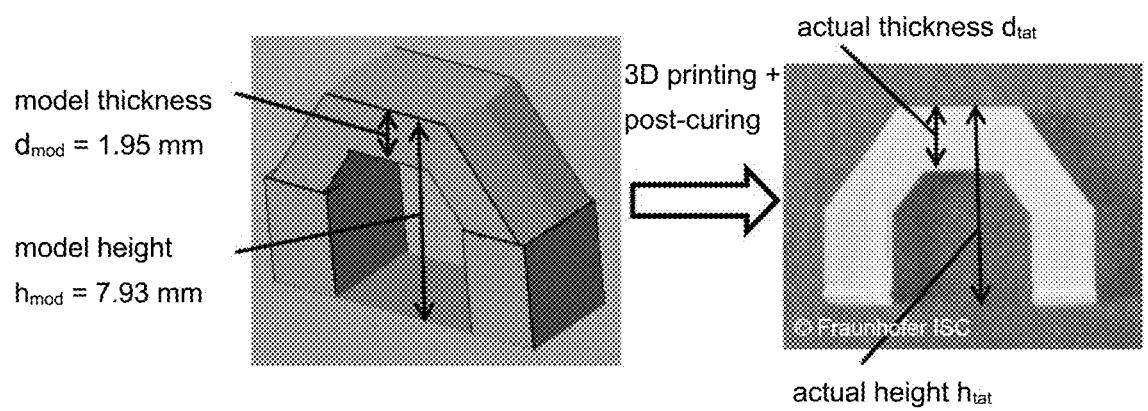
FIG. 1 shows details of the determination of the defective through-polymerization (FD) illustrated using a bridge as a test specimen.

In a preferred design, the test specimens have the shape of bridges or have the form of an "H". In both cases, the specimens are two beams resting on the building platform (section A), with a crossbeam between the two beams which does not rest on the building platform (section B), but leaves a free space between its side "above" during the procedure and the movable platform. At the end of the procedure, when this crossbar is in contact with the bottom of the bath, the test piece has the shape of a bridge, as shown in FIG. 1. If the crossbar does not reach the bottom of the bath, but the bars of section A do, the test piece has the shape of an "H".

The dimensions of a virtual model for each specimen in the z-direction on which the method is based, including the total component height, shall be known, and the actual dimensions in the z-direction of the specimen produced by the method shall be determined after the method is completed.

Since the post-curing of the components causes a slight shrinkage of the component height, this must be included in the consideration. The model height $h_{mod}$ of the test specimen is given, and since the actual height of the entire test specimen $h_{tat}$ is limited by the glass plate (the bath bottom)

and the (building) platform of the 3D printer, the effect of the FD has no effect on it. Therefore, by measuring the actual height $h_{tat}$ of the printed part, the height shrinkage S due to post-curing can be calculated as follows:

$$S = 1 - \frac{h_{tat}}{h_{mod}} \text{ [without unit]} \quad \text{Formula (1)}$$

Next, the theoretical target thickness $d_{nom}$ without FD is determined at the overhang, i.e. at section B. The model thickness $d_{mod}$, which is also given, can be used to calculate the target thickness after the printing process and post-hardening, as shown in the following formula, using the previously calculated shrinkage S.

$$d_{soll} = d_{mod} - (d_{mod} \cdot S) = d_{mod}(1-S) \text{ [mm]} \quad \text{Formula (2)}$$

Using the measured actual thickness of the overhang/section B $d_{tat}$ and the calculated nominal thickness $d_{soll}$, the FD can then be calculated in % using the following formula (3). A value of 0% corresponds to the desired target thickness. If the value exceeds 0%, this corresponds to an undesired increase in the nominal thickness, which is caused by the polymerization of liquid material.

$$FD = \left(\frac{d_{tat}}{d_{soll}} - 1\right) \cdot 100[\%] \quad \text{Formula (3)}$$

By inserting formula (1) and formula (2) into formula (3) and with $d_{mod}$=1.95 mm and $h_{mod}$=7.93 mm, we finally get (formula 4):

$$FD = \left(\frac{d_{tat} \cdot h_{mod}}{d_{mod} \cdot h_{tat}} - 1\right) \cdot 100 = \left(4\frac{1}{15} \cdot \frac{d_{tat}}{h_{tat}} - 1\right) \cdot 100[\%] \quad \text{Formula (4)}$$

The FD in the present application was always determined on the basis of such bridges.

To determine FD, the exposure times for 3D printing must be reduced until the surface of the part is affected. This approach is important because part quality, defective through-polymerization and exposure time are related, although it must be borne in mind that the exposure time also depends on the intensity of the radiation: The total amount of radiation is roughly calculated from the product of the intensity of the radiation and the exposure time. It must also be taken into account that the exposure time also depends on the layer thickness. As a rule, the higher the exposure time, the better the surface quality will be—and up to a certain upper limit of the exposure time—but the FD will also increase more. If, on the other hand, the exposure time is too short, a low FD can be determined, but at the expense of the surface quality. Thus, the lowest exposure time at which the component surface is still very good, i.e., a completely smooth surface free of visually (with the naked eye) visible ripple structures and roughness and fully formed and sharp contours, corners and edges, and/or at which an increase in exposure time does not lead to any improvement of the component surface, is selected as the "optimum exposure time" for a material system and the FD of the components is determined on the basis of the associated bridges.

According to the invention, the invention also provides a method for determining the defective through-polymerization (FD) of a shaped body, produced according to one of the methods applicable according to the invention, in particular the DLP or CLIP method, wherein the body is produced from a liquid or viscous bath material located in a bath container and the solidification of the shaped body takes place thereby, in that light from a radiation source is directed through a light-transmitting part of the bottom of the bath container onto a downwardly directed region of a surface of a platform located in the bath material and movable away upwards in the z-direction, a layer of the liquid or viscous bath material located there being subjected to organic polymerization by the action of radiation and thereby solidified, whereupon further layers of the liquid or viscous material are successively added, which are each located on the layer of the last solidified material, are solidified with the aid of this radiation source by moving the platform away upwards in the z-direction, characterized in that a sample body with at least two different sections serves as the shaped body, a first section A having at least one, preferably several solidified layers, which are formed starting from the surface of the platform, and a second section B has solidified layers which do not extend in the z-direction as far as the building platform, the dimensions of a virtual model for the specimen in the z-direction on which the method is based being known, and the actual dimensions in the z-direction of the specimen produced by the method after completion of the method—i.e. if necessary after correspondingly applicable post-treatments such as washing and/or after-hardening, wherein the FD is determined by means of the formula $$FD = \left(\frac{d_{tat} \cdot h_{mod}}{d_{mod} \cdot h_{tat}} - 1\right) \cdot 100 = \left(4\frac{1}{15} \cdot \frac{d_{tat}}{h_{tat}} - 1\right) \cdot 100[\%]$$

where $h_{mod}$ denotes the height of the virtual model of the sample body in the z-direction, $h_{tat}$ denotes the specific height of the generated sample body in the z-direction, $d_{mod}$ denotes the dimensions of the or a layer in section B of the virtual model of the sample body, and $d_{tat}$ denotes the specific height of this layer in section B of the generated sample body.

5. Reduction of "Defective Through-Polymerization" (FD)—Concrete Proposals

The present invention offers a whole range of solutions to the problem of defective through-polymerization, whereby various effects can arise, each of which can be advantageous depending on the desired application.

For example, the refractive index of matrix and filler can be selected so that the difference in refractive index between matrix and filler is small after curing, so that the finished part has a high translucency as desired. As the refractive index of the matrix changes during curing, as mentioned above, the refractive index of the matrix and filler can be selected so that the light scattering of the not yet cured material is higher. It is preferred that the refractive index of the filler (or more generally: of a particulate or fibrous additive) prior to solidification is at least 0.02, more preferably at least 0.05 higher than that of the resin matrix.

The refractive index of the matrix can be adjusted to the refractive index of certain particles either by a matrix modification itself (e.g. by using a material as described in DE 102013108594) or by using certain dispersed nanoparticles, such as $ZrO_2$, $TiO_2$, ZnO or ZnS ($n_D$ increase) or e.g. $SiO_2$ ($n_D$ decrease) (see details below). Furthermore, organic structures whose refractive index changes by a structural change upon exposure to light can be included, such as coumarins, stilbenes and chalcone derivatives. These can produce the same effect of opacity change. The difference in refractive index in the uncured state results in the material being more opaque when printed. This opacity in turn has a positive influence on the shape accuracy in the z-axis (the defective through-polymerization). A filled material that is relatively opaque in the flowable, uncured state but becomes more translucent during curing by matching the refractive indices of the matrix and filler is therefore particularly suitable for dental applications. The effect is therefore beneficial both to the shape accuracy and to the application.

In accordance with the invention, it could be determined overall that, in order to avoid or reduce the FD of shaped bodies with bridges, slopes or overhangs, the bath material can be modified in various ways, in particular with inorganic and/or organic photostabilizers (=e.g. photoabsorbers or optical brighteners) (which are also referred to here as UV absorbers/UV stabilizers due to the polymerization wavelengths in the border region visible/UV used here for the 3D printing processes), whereby various other, sometimes surprising effects can result in addition to the reduction of the FD.

5.1 Post-Treatment of the Shaped Parts According to Chapter 5:

I. Post-treatment for 3D-printed polysiloxane components with LTPO and DBPO (rods for 3-point bending tests and bridges for FD determination): Unless otherwise specified, the 3D-printed components were washed in isopropanol in an ultrasonic bath, the isopropanol was blown off with compressed air, and the shaped bodies were dried for a few minutes at 23° C. to evaporate residual solvent, and finally post-cured in the oven for 2 h at 100° C.

II. Post-treatment for 3D printed polysiloxane parts with LTPO, without DBPO (bridges for FD determination): Unless otherwise specified, the 3D printed parts were washed in isopropanol in an ultrasonic bath, the isopropanol was blown off with compressed air, and the shaped parts were cleaned for a few minutes. The isopropanol was blown off with compressed air, and the shaped bodies were dried for a few minutes at approx. 23° C. to evaporate residual solvent, then dried in the oven for 30 minutes at 40° C., and finally post-cured with a flashlight unit (G 171 Otoflash from NK Optik, 3000 flashes, 5 minutes) in a nitrogen atmosphere.

III. Post-treatment for 3D printed polysiloxane components with LTPO, without DBPO (test rods for 3-point bending tests): Unless otherwise specified, the 3D printed components were washed in isopropanol in an ultrasonic bath, the isopropanol was blown off with compressed air, and the shaped parts were subjected to an ultrasonic treatment for a few minutes. The isopropanol was blown off with compressed air, and the shaped bodies were dried for a few minutes at approx. 23° C. to evaporate residual solvent, then dried in the oven for 30 minutes at 40° C. and finally post-cured in a nitrogen atmosphere with a flash light unit (G 171 Otoflash from NK Optik, 3000 flashes, 5 min) and then in the oven at 100° C. for 2 hours.

5.2 Conventional Production of Test Rods for Measuring Mechanical Properties:

a. Production of polysiloxane components with LTPO and DBPO: Analogous to 3.1.11.

b. Production of polysiloxane components with LTPO, without DBPO: Analogous to 3.1.1.

5.3 Reducing the FD by Reducing Translucency

Special plates were produced to measure the translucency. The translucency plates had a diameter of 18 mm and a height of 2 mm. They were produced by casting the respective material in a stainless steel mold with a round recess, whereby the upper and lower sides of the sample were each surrounded by a PET film followed by a glass plate. (If necessary, the materials were degassed to ensure complete freedom from bubbles.) For materials containing DBPO and LTPO, curing was carried out thermally at 100° C. for 4 h. Materials containing only LTPO were light-induced cured for 2×120 s (top and bottom side) with the Polofil® Lux dental lamp from Voco.

The translucency of the platelets was measured using the Color i7 spectrophotometer from x-rite, in the visible range at intervals of 10 nm from 380 nm-750 nm (for the translucency value, the average value was formed from all values between 380 and 750 nm). For each material, 2 different positions of a platelet were measured and the mean value was calculated.

In a first formulation of embodiments of the invention aimed at FD reduction, a particulate material is added to the resin material, which has a preferably strong deviation of the refractive index from that of the resin material (and is usually higher than that of the resin material) and causes light scattering. The (usually strong) light scattering reduces the translucency of the material (the material becomes white/opaque). This prevents light radiation from penetrating far into the material in the z-direction during 3D printing, and thus from penetrating beyond the area of the already formed shaped part into unpolymerized bath material. The particulate material can be inorganic particles, for example of titanium dioxide, zirconium oxide, zinc oxide, zinc sulfide and/or silicon dioxide, but also fibrous material is possible.

If the inorganic particles have only a small primary particle diameter, for example from about 5 to about 100 nm, they must be in agglomerated form in order to achieve the desired effect.

This phenomenon can be demonstrated by the use of $TiO_2$ (in the concrete example a nanospheric white pigment with a primary particle diameter of 10-30 nm, present in the form of agglomerates, company io-li-tec nanomaterials, Heilbronn, Germany). The agglomerates have a diameter that ranges from the upper nm range to the μm range and scatter the light, resulting in an overall non-selective light scattering, which makes the composite appear white due to the emerging scattered light.

Due to the large difference in refractive index of the resin matrix and the $TiO_2$ particles, this behavior is very pronounced, and very small particle quantities (e.g. 0.1 to 1 wt %, preferably approx. 0.5 wt %) are sufficient to achieve high opacity.

5.3.1 Material production:

A. In basic resin system 1, DBPO (2 wt %) was first dissolved at 40° C., followed by LTPO (1 wt %) at 34° C.

B. In basic resin system 1, first DBPO, then LTPO was dissolved as described for A. The material was then mixed with 0.5 wt % $TiO_2$ (nanoparticles as indicated above), premixed in the Speedmixer (1 min, 2000 rpm), then incorporated by means of a three-roll mill and again followed by the Speedmixer.

In the uncured state, the resulting material system A had a translucency of 100% and the resulting material system B had a translucency of only 3%. In the cured state, it had a translucency of 84% (without $TiO_2$) and 16% with $TiO_2$.

5.3.2 Results

A comparison of bridges, manufactured according to material production A. and B. and each 3D-printed, resulted in the following The viscosity of the basic resin system without $TiO_2$ absorber was 4.9 Pa·s at 25° C. and 1.3 Pa·s at 40° C. At a layer thickness of 100 μm, printing with exposure times of 24 s per layer resulted in an FD of 78% for the material without $TiO_2$ and an FD of only 2% for the material with $TiO_2$ that had been exposed at 8 s per layer (layer thickness=100 μm). With the same layer thickness and exposure time in each case, bending strengths of 102 MPa for the $TiO_2$-free material and still 85 MPa for the $TiO_2$-impregnated material were determined using 3D printed rods. The moduli of elasticity were 2.2 GPa in both cases.

The result surprises in a positive way: While without absorbers the overhang of the bridge is almost twice as thick as desired (FD=78%), the FD is reduced to only 2% when using $TiO_2$. Thus, both properties (good surface quality combined with high dimensional stability due to minimal FD) can be combined very well. In addition, the short exposure time required when using $TiO_2$ (only 8 s) is to be seen positively, as this allows the process time to be kept low.

It should be noted that the strength of the $TiO_2$ added material is generally lower than that of the resin without this additive. This is because the particles are not surface modified. This disadvantage can be overcome by using, instead of purely inorganic particles, those with a suitable surface modification with groups that can be polymerized into the organic network, e.g. (meth)acrylic or norbornenyl groups. However, if such surface-modified particles have small diameters like those in the example in question, they do not scatter, as shown in section 5.4. below, because they are then not agglomerated but dispersed in the resin.

Therefore, the surface-modified particles should then have larger diameters. Such large particles lead to scattering as desired, provided that they have a sufficiently large refractive index difference to the matrix.

5.4 Reducing the FD while Retaining the Desired Translucency

In a second configuration of this preferred embodiment of the invention, it becomes possible to lower the FD without losing the possibly desired high translucency. This is achieved with dispersed inorganic nanoparticles such as those made of $ZrO_2$ ($ZrO_2$-NP) with primary particle diameters of preferably approx. 5 to 100 nm. Since the nanoparticles are dispersed, a high translucency of the material system results. In contrast to the previous example, the function as light absorber does not result from light scattering/opacity (see G. Wypych, loc. cit.).

5.4.1 Material Production:
C. In basic resin system 1, LTPO (2 wt %) was dissolved at 40° C. The post-treatment of the printed rods was also carried out according to Principle 5.1.11, in deviation from the conventional principle.
D. Composite with 30 wt % $ZrO_2$—NP: LTPO was added to basic resin system 1 as described for C. Subsequently, 30% by weight of $ZrO_2$-NP dispersed in ethyl acetate (company Pixelligent, Baltimore (USA), PixClear PCPB-2-50-ETA, Ø=7-10 nm, 50% by weight dispersed in ethyl acetate) was added. These are silanized (methacrylate functionalized). After dissolving the initiator and completely dispersing the nanoparticles, the solvent was removed under reduced pressure.

5.4.2 Results

A comparison of bridges (to determine the FD) and rods (to determine the mechanical properties), manufactured according to material production C. and D. and each 3D-printed, resulted in the following The viscosity of resin system C without $ZrO_2$ absorber was 4.8 Pa·s at 25° C. and 1.2 Pa·s at 40° C. The translucency was 80%. At a layer thickness of 50 μm, printing with exposure times of 3 s per layer resulted in an FD of 68% for the material without $ZrO_2$ (instead of material C., FD and translucency measurements were carried out here using a material produced with only 1 wt % LTPO). The viscosity of resin system D with $ZrO_2$ absorber was 6.7 Pa·s at 25° C. and 1.8 Pa·s at 40° C. The translucency was 78% (instead of material D, FD and translucency was measured here with a material produced with only 1% LTPO by weight). At a layer thickness of 100 μm, printing with exposure times of 10 s per layer resulted in an FD of only 17% for the material with $ZrO_2$. At a layer thickness of 100 μm and an exposure time of 8 s for 3D printing, a flexural strength of 90 MPa and a modulus of elasticity of 2.1 GPa were measured for material C. For material D, a flexural strength of 81 PMa and a modulus of elasticity of 2.4 GPa were found for material D at a layer thickness of 25 μm and an exposure time of only 5 s in 3D printing.

The inventors were thus able to show that dispersed (isolated!) inorganic nanoparticles have an effective influence on the FD (in the example only 17%, a very good value) and can thus act as suitable photoabsorbers. For the first time, material systems with high translucency, without organic photoabsorbers and yet with significantly reduced FD can be printed. In addition, the possible short exposure time of only 10 or even 5 s, with which good surface properties can already be achieved, is positive.

Alternatively, it is possible to maintain the translucency by using a resin with an increased refractive index, for example one of the base resins 1a to 1 d, 3 and 4 in such a way that the refractive index of the resin and the refractive index of the added particles are as similar as possible. Then it is not necessary to add dispersed nanoparticles with the aim of changing the refractive index. The addition of agglomerating, scattering particles is then also possible.

5.5 Reduction and Equalization of the FD by Addition of an Organic Photo Absorber The FD can also be lowered with the help of organic photo absorbers. Organic photoabsorbers act e.g. via the mechanism of energy dissipation. In this respect, it can be referred to G. Wypych, Handbook of UV Degradation and Stabilization, ChemTec Publishing, Toronto 2015, p. 34, 43-46.

Examples of organic photoabsorbers are benzophenones such as DHDMBP=2,2'-dihydroxy-4,4'-dimethoxy-benzophenone, Cyasorb UV-416=2-(4-benzoyl-3-hydroxyphenoxy)ethylacrylat, Cyasorb UV-531=2-hydroxy-4-n-octoxybenzophenone, Cyasorb UV-9=2-hydroxy-4-methoxybenzophenone, Chiguard BP-1=2,4-dihydroxybenzophenone, Chiguard BP-4=2-hydrox-4-methoxybenzophenon-5-sulfonic acid or Chiguard BP-2=2,2',4,4'-tetrahydroxy-benzophenone and benzotriazols such as Tinuvin 327=2-(3,5-di-tert-butyl-2-hydroxyphenyl)-5-chloro-2H-benzotriazol, Chiguard 323=2-[3-(2H-benzotriazol-2-yl)-4-hydroxyphenyl]ethyl methacrylat, Chiguard R-445 (benzotriazol), Chiguard 5431=2,2'-methylene bis(6-(2H-benzotriazol-2-yl) 4-,1,1,3,3,tetramethyl butyl)phenol, Tinuvin P=2-(2'-hydroxy-5'-methylphenyl)-benzotriazol, Tinuvin 326=2-(5-chloro-2H-benzotriazol-2-yl)-6-(1,1-dimethylethyl)-4-methyl-phenol, Tinuvin 328=2-(2H-benzotriazol-2-yl)-4,6-ditertpentyl-phenol, Chiguard 5411=2-(2'-hydroxy-5'-tert-octylphenyl)-benzotriazol or Chiguard 234=2-[2-hydroxy-3,5-di-(1,1-dimethylbenzyl)]-2H-benzotriazol.

Also by the addition of an optical brightener such as TBT=2,5-thiophenediylbis(5-tert-butyl-1,3-benzoxazole), Uvitex OB-ONE=2,2'-(1,2-ethylenediyldi-4,1-phenylene) bis-benzoxazole, Eutex 127=1,1'-biphenyl-4,4'-bis[2-(methoxyphenyl)ethenyl], Eutex KCB=2,2'-(1,4-naphthalenediyl) bis-benzoxazoles, Eutex CBS=1,1'-biphenyl-4,4'-bis[2-(sulphophenyl) ethenyl] disodium salt, Eutex KSN=4,4-bis (5-methyl-2-benzoxazole)-ethylene or tris (dibenzoylmethane) mono(1,10-phenanthroline)europium (III) a reduction of the FD can be achieved.

Organic photostabilizers with reactive groups, e.g. (meth) acrylate groups, are particularly preferred for covalent bonding to the matrix (e.g. Chiguard 323 and Cyasorb UV-416).

5.5.1 Sample Preparation:

LTPO (1 wt %) and, if applicable, DBPO (2 wt %) were dissolved in basic resin systems 1 and 2 at elevated temperature and subsequently, if applicable, the corresponding absorber was also dissolved at an elevated temperature of 40° C.

Deviating post-treatment of the bridges with/without DHDMBP, without DBPO:

All 3D-printed components were washed in isopropanol in an ultrasonic bath, blown off with compressed air, dried for a few minutes at RT for a residual evaporation of the solvent and post-cured with a flash light unit (3000 flashes, 5 min).

Different post-treatment of the rods with/without TBT: see above, post-treatment 5.1.11

5.5.2 Results:

(a) Results with basic resin system 1: The basic resin system 1 with 1% LTPO and 2% DBPO used here for comparison had a translucency of 82% and—at a layer thickness of 100 μm and an exposure time of 20 s per layer during printing—an FD of 60%. The flexural strength of the resulting shaped body—with the same exposure time and layer thickness—was 98 MPa (90 MPa for conventional production without a printing technique according to the invention) and a modulus of elasticity of 2.1 GPa (2.2 GPa for conventional production without a printing technique according to the invention). If 1 wt % DHDMBP was added to this system, the translucency dropped only slightly, namely to 78%. The FD dropped to 17%, whereas the exposure time of the 100 μm thick layers had been increased to 52 s. The flexural strength of the 3D printed material—with the same exposure time and layer thickness—was still 96 MPa and the Young's modulus was unchanged at 2.1 GPa. When using a resin with no DBPO compared to the above materials, the FD decreased from 121% (resin without DHDMBP) (exposure time=8 s, layer thickness=100 μm) to 16% when DHDMBP was added to the resin (exposure time=20 s, layer thickness=100 μm). If 0.0040 mmol/g TBT was added to this resin instead of DHDMBP, the FD dropped to values of 20% (measured: 23% at a layer thickness of 25 μm and an exposure time of 5 s and 17% at a layer thickness of 50 μm and an exposure time of 10 s). The values for flexural strength and Young's modulus were also good; 80 MPa and 1.9 GPa were measured for a system to which LTPO was added in addition to TBT 2% (layer thickness=25 μm; exposure time=6 s).

Figure 4:
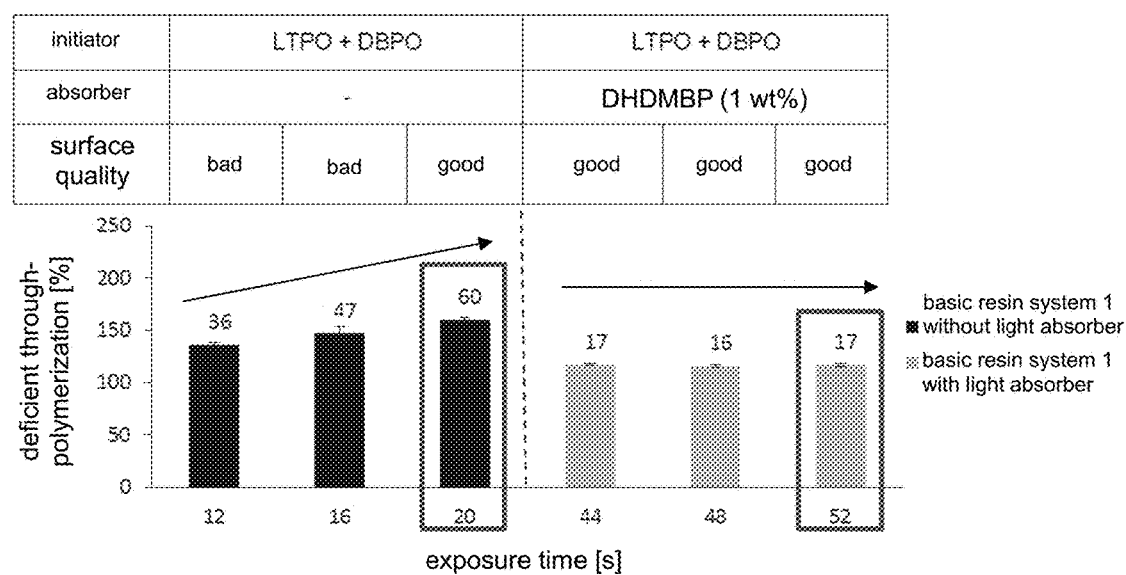
FIG. 4 shows graphically the influence of the addition of DHDMBP to starting materials that can be used according to the invention.

The material system of base resin 1 with 1 wt % LTPO and 2 wt % DBPO was further investigated without and with 1 wt % DHDMBP for the influence of exposure time. It was found that for the DHDMBP-free material, although the surface quality increased as the exposure time increased, the FD also increased (with an increase from 36% to 60% from 12 to 20 s per layer). If, on the other hand, the material contains an additional 1% by weight of DHDMBP, a consistently good surface quality is obtained, as well as a consistently low FD (approx. 17% in the range between 44 and 52 s exposure time per layer) (the results are shown in FIG. 4, see the arrows). Thus, by adding DHDMBP, it is possible to compensate for fluctuations during the 3D printing process, such as those caused by fluctuating light intensity, both in terms of surface quality and FD. This principle can be transferred to other material systems with low FD.

(b) Results with basic resin system 2:

Basic resin system 2 with 2 wt % LTPO, without DBPO: LTPO was dissolved in resin system 2 at elevated temperature and subsequently the absorber TBT was dissolved in an amount of 0.0010 mmol/g, also at elevated temperature of 35° C. The viscosity of the material was 33 Pa·s at 25° C. and 5.8 Pa·s at 40° C. The 3D printing tests were performed with a layer thickness of 50 μm with 16 s exposure time per layer. An FD of only 20% could be determined. The test specimens produced in this way had a flexural strength of 105 MPa and a modulus of elasticity of 3.2 GPa.

According to the invention, it has been shown that the FD can also be significantly reduced with organic photo absorbers. Very good results are obtained when using 1 wt % DHDMBP with an FD of 17 (with DBPO) or 16% (without DBPO) and when using only 0.0040 mmol/g TBT with an FD of 17%. In particular, the exposure times of 20 s (when using DHDMB without DBPO) and 10 s for basic resin system 1 and 16 s for basic resin system 2 (with addition of TBT) are very low, which allows a fast production of the shaped bodies.

Another positive aspect is that the photoabsorber DHDMBP has no negative effects on the mechanical properties of the material systems: The strength without and with absorber is approximately the same (98 MPa without absorber, 96 MPa with absorber).

The big difference between the FD of the basic resin system 1 without photoabsorber with (FD=60%) and without (FD=121%) DBPO is also noticeable. This leads to the conclusion that DBPO also acts surprisingly as a photoabsorber itself and reduces the FD considerably.

In addition, the tests show that when using basic resin system 2, a much lower addition of organic photoabsorber is sufficient to achieve a comparable FD on the one hand, but even better mechanical values (a flexural strength of 105 MPa!) on the other hand. The bridges produced had excellent translucency for the eye, even if this was not measured.

5.6 Reduction of FD by Adding a Combination of Inorganic and Organic Photo Absorber The FD can be reduced particularly well by using a combination of inorganic and organic photo absorber.

Sample Preparation

In basic resin system 1, first 2 wt % LTPO and then 0.0035 mmol/g TBT were dissolved at 40° C. As shown above, 30% by weight of methacrylate-functionalized $ZrO_2$ particles (company Pixelligent, PixClear PCPB-2-50-ETA, 0=7-10 nm, 50% by weight dispersed in ethyl acetate) were incorporated. The resulting composite was printed with a layer thickness of 25 μm with an exposure time of 5 s per layer. The conventional rods were exposed with 2×120 s (top side+bottom side) in deviation from the usual exposure time. The flexural strength was 70 MPa (for comparison: with conventional production it was 72 MPa), the modulus of elasticity was 2.3 GPa (with conventional production: 2.1 GPa). At an exposure time of 16 s per layer, which was 50 μm thick, an FD of only 13% could be determined.

For comparison: If 0.0040 mmol/g TBT was added to the basic resin system in addition to LTPO, but no $ZrO_2$ particles, the FD value was 23% (1 wt % LTPO; layer thickness 25 μm) and 17% (1 wt % LTPO; layer thickness 50 μm), the flexural strength at 80 MPa (2 wt % LTPO) and the Young's modulus at 1.9 GPa (2 wt % LTPO), as already indicated above under 5.5.2 (a).

It has been shown that an even better result can be achieved with translucent materials with an FD of only 13% by using a combination of organic and inorganic absorbers.

6. Post-Treatment Process

6.1 Post-Treatment Processes for Improving the Surface of the Shaped Body

6.1.1 Bath Material with a Combination of Photo-Initiator and Thermal Initiator The basic resin system 1 with 1 wt % LTPO and 2 wt % DBPO was used as bath material.

The post-treatment was carried out according to I., as indicated under 5.1. (washing in an ultrasonic bath was performed for 60 s).

The post-treatment procedure ensures that there is no longer an adhesive layer on shaped bodies made of this material. As mentioned, the flexural strength was 102 MPa and the modulus of elasticity was 2.2 GPa.

This post-treatment procedure can be applied analogously to all other material compositions (e.g. with light absorber, with particles, with different matrix).

6.1.2 Bath Material with Photoinitiator Only, without Thermal Initiator

Bath material was basic resin system 1 with 2 wt % LTPO, once without and once with 0.0035 mmol/g TBT. The post-treatment was carried out according to II. as indicated under 5.1. (drying in air was carried out for 5 min).

This post-treatment procedure can be applied analogously to all other material compositions (e.g. with light absorber, with particles, with different matrix).

This post-treatment procedure ensures that the adhesive layer is completely removed from shaped parts made of the materials mentioned above and that the surface is therefore tack-free. The flexural strength of the formed shaped bodies was 90 MPa for the basic resin system without photoabsorber and 80 MPa for the basic resin system with TBT. The moduli of elasticity for both were 1.9 GPa.

6.2 Post-Treatment Processes to Improve Polymerization Turnover

Bath material was basic resin system 1 with 2 wt % LTPO. once without and once with 0.0035 mm/g TBT.

Post-curing procedure: Washing in isopropanol in ultrasonic bath (50 s)→Drying with compressed air→Drying in air at RT (5 min)→Drying in 40° C. oven (30 min)→(3000 flashes, 5 min)→
a) Post-curing for 2 h in 100° C. oven, preheated
b) Post-curing with UV lamp (UV-LED-eco, Honle) (5 min)

Variant (a) resulted in sales of 88% (without TBT) or 85% (with TBT). For variant (b), revenues were 87% (without TBT) and 73% (with TBT). Although the material contained only photoinitiator, an additional post-treatment thus resulted in very high sales of up to almost 90%. The presence of photoabsorber hardly played a role, nor did the selected process (post-curing thermally or with UV radiation).

This post-treatment procedure can be applied analogously to all other material compositions (e.g. with light absorber, with particles, with different matrix).

7. Examples for the Production of Complex Component Geometries

Figure 5:
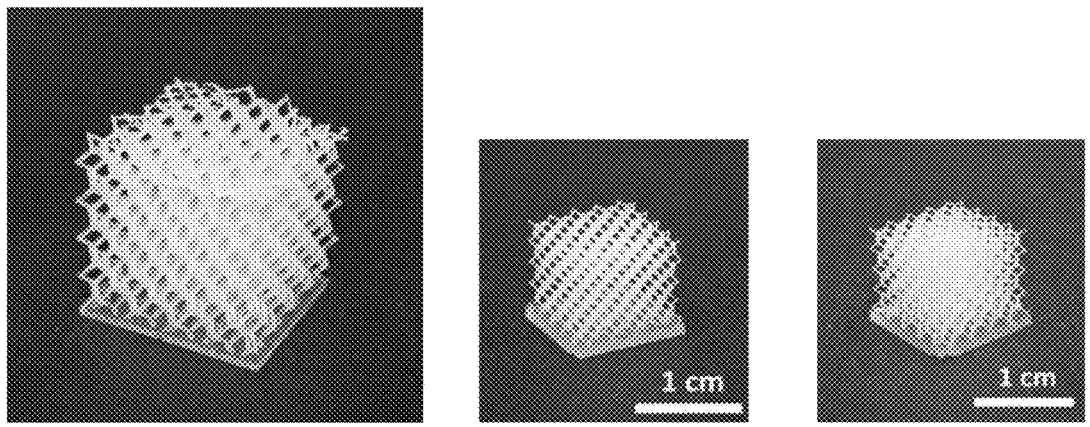
FIG. 5 shows different shaped bodies produced by the method according to the invention, taken with a camera.

FIG. 5 shows the complex geometries of shaped bodies that are possible with the method according to the invention.

The shaped bodies were made of base material 1 with 2 wt % LTPO and 0.0035 mmol/g TBT. The layer thickness was 50 μm. For the grids with a side length of 1 cm, each layer was exposed for 18 s; the printing time was approx. 1 h 30 min. For the grids with a side length of 2 cm, an exposure time of 16 s per layer was selected; the printing time was approx. 3 h. After printing, the shaped bodies were washed in an ultrasonic bath in isopropanol, dried for a few minutes at ambient temperature to remove any residual solvent, then dried in the oven at 40° C. for 30 minutes and finally post-cured with a flash unit in $N_2$ atmosphere (3000 flashes, 5 min).

8. Adjustment of Mechanical Properties and Translucency—Other Filled Resin Systems By using composites, produced by combining the resin systems with different fillers, further properties of the shaped parts can be influenced.

8.1 Filling with Nanoparticles (Nanocomposites)

As examples, the addition of nanoparticles ($SiO_2$ and $ZrO_2$) as fillers was investigated.

8.1.1 Nanocomposite with $SiO_2$ Nanoparticles ($SiO_2$-NP) as Bath Material 8.1.1.1 The nanoparticles used were $SiO_2$-NP from the Chemiewerk Bad Köstritz, Köstrosol 3550, Ø=50 nm, 50% by weight dispersed in water, unsilanized (hydroxy groups on the surface). These particles were silanized in the usual way.

8.1.1.2 Composite composition and preparation of a nanocomposite with a filler content of 20 wt % $SiO_2$—NP (silanized):

First, 2 wt % DBPO, then basic resin system 1 and finally 1 wt % LTPO were dissolved in EtOH. Then the $SiO_2$ nanoparticles dispersed in ethanol were added in such an amount that the resulting nanocomposite contained 20% by weight of these nanoparticles. The composite was stirred for 2 h and the solvent was removed under reduced pressure. For comparison, the basic resin system 1 was produced with the same components but without nanoparticles.

The viscosity of the unfilled basic resin system was determined to be 4.9 Pa·s at 25° C. and 1.3 Pa·s at 40° C., the translucency was determined to be 84%. The viscosity of the nanocomposite filled with 20% by weight was 12 or 2.9 Pa·s at the above temperatures, the translucency was 69%. The shaped bodies printed according to the invention (layer thickness 100 μm each, exposure time 24 s for the unfilled resin, 17 s for the nanocomposite) had a flexural strength of 102 MPa (unfilled, see above) and 97 MPa (nanocomposite) and a modulus of elasticity of 2.2 GPa (unfilled, see above) and 3.1 GPa (nanocomposite), respectively. A flexural strength of 98 MPa and a modulus of elasticity of 2.9 GPa were determined for conventionally produced nanocomposite bodies.

Good strength can therefore be achieved by adding dispersed nanoparticles. In addition, a translucency of 69% was found for the nanocomposite. With the help of dispersed nanoparticles, it is therefore possible to produce shaped bodies with very good strength and modulus of elasticity, which also have a high translucency. This makes them highly attractive for dental applications.

8.1.2 Nanocomposite with $ZrO_2$—NP as bath material

Section 5.4 described the reduction of the FD while maintaining the desired translucency by adding dispersed, functionalized $ZrO_2$ nanoparticles. The inventors found that such nanoparticles can be used not only to reduce the FD but also to adjust the refractive index. The following resins/composites were produced for this purpose:

C. Basic resin system 1 as specified in Section 5.4.1 C,
D. Composite with 30 wt % $ZrO_2$—NP as specified in section 5.4.1 D
E. Composite with 30 wt % $ZrO_2$-NP and 0.0035 mmol/g TBT as specified in section 5.6.

The viscosity, translucency, FD, flexural strength and modulus of elasticity of the basic resin system without TBT, with and without nanoparticles, are given in sections 5.4.2 and 5.6. The refractive index for the nanoparticle-free basic resin system 1 was determined at 1.479 before exposure and at 1.512 after curing. The composite D. had an uncured refractive index of 1.521, after curing 1.544. These values show that the refractive index of the basic resin system can be significantly increased by using the zirconium dioxide nanoparticles. This is an effect that can be particularly effective when additional fillers are to be used and the refractive index of the matrix and fillers is to be adjusted (due to the dispersion of the nanoparticles, they act like a component of the matrix in terms of optical properties because they do not scatter light.) Another positive aspect is the long storage stability of the nanocomposites of at least 10 months.

8.2. Macrocomposites
Sample Preparation:
A. Basic resin system 1 as specified in Section 5.3.1 A
F. Composite from basic resin system 1. with 40 wt % dental glass particles (DGP): In basic resin system 1, 2 wt % DBPO and then 1 wt % LTPO were dissolved at 40° C. Subsequently, 40 wt % dental glass particles (DGP: Schott, G018-307 with Ø=0.7 µm, silanized) were added and homogeneously incorporated by means of a three-roll mill.

Characterization: For the macrocomposite F. a viscosity of 22 Pa·s at 25° C. and of 5.3 Pa·s at 40° C. was determined. It can therefore be used very well in the process that is applicable according to the invention. The translucency was only slightly reduced by the addition of the dental glass particles, namely from 82% to 75%. The flexural strength and the modulus of elasticity of the shaped bodies of material F. produced with the method according to the invention were determined to be 113 MPa and 3.5 GPa, respectively. For comparison: in conventional production, the bending strength was 112 MPa and the modulus of elasticity 3.6 GPa. Thus, a substantial increase in strength can be observed at a filler content of 40 wt % (for values for system A., see section 5.3.2).

8.3 Nanohybrid Composites with Nanoparticles and Larger Particles
8.3.1 Nanohybrid Composite with $SiO_2$ Nanoparticles and Dental Glass Particles
Sample Preparation:
A. Basic resin system 1 as specified in Section 5.3.1.A.
G. Composite of basic resin system A. with $SiO_2$-nanoparticles (dispersed, silanized, Nissan Chemical Industries, MEK-AC-4130Y, particle size 40-50 nm) and dental glass particles (silanized, Schott, type G018-307, primary particle diameter 0.7 µm): LTPO and DBPO were dissolved in EtOH, then basic resin system 1 was dissolved in EtOH in such a way that LTPO was mixed with 1 wt % of $SiO_2$ wt % and DBPO at 2 wt %, based on the base resin. $SiO_2$ nanoparticles dispersed in methyl ethyl ketone were then added. After mixing and homogenization (to ensure homogeneous distribution of the particles in the resin matrix), the solvent was removed under reduced pressure. Subsequently, the dental glass particles were added and homogeneously incorporated by means of a three-roll mill in such a way that the various particles were present in a weight ratio of 29:71 ($SiO_2$—NP:dental glass particles), resulting in a total filler content of 60% by weight.

Characterization: The viscosity of composite G. was 104 Pa·s at 25° C. and 22 Pa·s at 40° C. Its translucency was still 38%. The flexural strength and modulus of elasticity of the G. composite shaped bodies produced by the method of the invention were 142 MPa and 5.5 GPa, respectively, thus achieving excellent values.

Overall, the inventors were able to establish that composites with very high filler contents (up to 60 wt %/40 vol % were investigated in several trials) can be printed, while viscosities of up to 104 Pa·s at 25° C. can still be handled. However, the use of the process according to the invention at slightly elevated temperatures (e.g. in a heating bath) may also be advantageous.

3D-printed nanophybrid composites achieve high mechanical properties (far beyond those of the unfilled reference material), as shown by the measured flexural strengths up to 142 MPa and Young's moduli up to 5.5 GPa. Flexural strengths for permanent dentures require about 150 MPa, e.g. for a single crown. The values determined here—for composites that have not yet been optimized—show that these values can easily be realized with the method according to the invention.

8.3.2. Nanohybrid composite with $ZrO_2$ nanoparticles, dental glass particles and organic photo absorber
Sample preparation:
C. Basic resin system 1 as specified in Section 5.4.1 C
H. 0.0035 mmol/g TBT was added to resin system C (contains 2 wt % LTPO).
Subsequently, $ZrO_2$—NP (silanized, company Pixelligent, PixClear PCPB-2-50-ETA, particle size 7-10 nm) dispersed in ethyl acetate at 50% by weight was also added. After dissolving the initiator and photoabsorber and after complete dispersion of the nanoparticles, the solvent was removed under reduced pressure. Subsequently, the dental glass particles (DGP) (silanized, Schott company, type GM27884, primary particle diameter of 0.7 and 3 µm in a ratio of 1:2) in a ratio of $ZrO_2$-NP:DGP 0.7 µm:DGP 3 µm=1:0.90: 1.80 were successively added and homogeneously incorporated in each case by means of a three-roll mill in such a way that a total filler content of 45 wt % was achieved.

Characterization: The viscosity of composite H. was 15 Pa·s at 25° C. and 3.8 Pa·s at 40° C., which is surprisingly low. The translucency of this material was 45%. A shaped body was produced from the composite using the method according to the invention by exposing layers each 50 µm thick. An FD of only 12% was observed, which is to be regarded as particularly positive. An exposure time of only 12 s per layer was sufficient. The part quality was also positive: the shaped body had smooth surfaces and sharp edges and corners.

Overall, it should be noted that translucency can be greatly improved by using basic resin systems whose refractive index is matched as far as possible to that of the fillers used. This is preferably achieved by adding components containing aryl groups, as mentioned above. This allows translucent shaped bodies to be obtained with simultaneously high values for flexural strength and modulus of elasticity.

In addition to the embodiments of the invention described above, the invention additionally comprises one which—contrary to the above explanations—may also contain silanes with only one hydrolyzable group.

Accordingly, the invention comprises (i) a process for producing a shaped body by means of a radiation-induced printing process according to the technique of the one-photon polymerization process, characterized in that the shaped body is produced by solidifying a liquid or viscous material which contains a polysiloxane component produced by hydrolytic condensation of one or more monomeric silanes with at least one organically polymerizable radical which is bonded to the silicon atom via carbon, and contains an initiator and/or catalyst for the radiation-induced polymerization of the organically polymerizable residue, and the solidification is effected by directing light from a radiation source onto a region of a surface of a substrate, a layer of the liquid or viscous material located there being subjected to organic polymerization by the action of radiation and thereby solidified, whereupon further layers of the liquid or viscous material, which are each located on the layer of the last solidified material, are successively solidified with the aid of this radiation source.

This method can be used in three variants. Each of these variants can be used as such or combined with a second variant; the combination of all three variants is also possible.

In the first variant of this process, the liquid or viscous material used for process (i) contains a particulate material or material dissolved in the polysiloxane component, which is capable of absorbing light of a wavelength corresponding to the wavelength of the radiation source used. The particulate material or material dissolved in the polysiloxane component can be a dissolved fluorescent material, an inorganic particulate solid, preferably $ZrO_2$, with particle sizes in the range of 5 to 100 nm, particularly preferably 5 to 20 nm, and/or an organic compound dissolved in the polysiloxane component.

In a second variant of this method (i), the polysiloxane component contains aryl groups attached to radicals bonded to silicon via carbon atoms.

In a third variant of this method (i), the polysiloxane component contains phosphonic acid, phosphinic acid, phosphate, sulfonic acid, sulfinic acid and/or carboxylic acid groups, each of which is attached to radicals bonded to silicon via carbon atoms.

The said additional embodiment of the invention comprises, in addition to the process (i), also (ii) a shaped body based on an organically polymerized silica (hetero) polycondensate which was produced by organic polymerization of a polysiloxane component formed by hydrolytic condensation of one or more monomeric silanes with at least one organically polymerizable radical which is bonded to the silicon atom via carbon. This shaped body has a flexural strength determined by a 3-point flexural test according to test standard DIN EN ISO 4049: 2009 with the Zwick/Roell universal testing machine Z100, with the changes that instead of water storage a dry storage was used and the feed rate was 3 mm/min, of at least 60 MPa, preferably of at least 80 MPa and most preferably of at least 90 MPa and/or a modulus of elasticity, determined in the linear range of the stress-strain curve between 10-20 MPa over the secant, of at least 1.4 GPa, preferably of at least 1.8 GPa and most preferably of at least 2.1 GPa. The shaped body according to (ii) may be produced by the method according to (i).

The shaped body according to the latter design (ii) may be composed of individual layers with a thickness in the range of 10 to 150 µm in a spatial direction, or it may be produced by continuous exposure to light. Preferably, it has a translucency of at least 45%, more preferably at least 55%, even more preferably at least 65% and especially preferably about 75%. Its flexural strength is preferably at least 100 MPa and/or its modulus of elasticity is preferably at least 3.2 GPa.

In accordance with the possibility of producing it by process (i), the shaped body may contain in a first variant inorganic, particulate solid, preferably $ZrO_2$ with particle sizes in the range of 5 to 100 nm, particularly preferably 5 to 20 nm, and/or an organic compound dissolved in the polysiloxane component.

In a second variant, its polysiloxane component may contain aryl groups attached to radicals bonded to silicon via carbon atoms. In a third variant, its polysiloxane component may contain phosphonic acid, phosphinic acid, phosphate, sulfonic acid, sulfinic acid and/or carboxylic acid groups each of which is attached to radicals bonded to silicon via carbon atoms.

Each of these variants can be used as such or combined with a second variant; the combination of all three variants is also possible.

In addition to the organically polymerized silica (hetero) polycondensate, the shaped body of the latter design according to (ii) may contain at least one filler selected from fillers consisting of agglomerated or dispersed inorganic nanoparticles with particle sizes in the range from 5 to 100 nm, including preferably those of $ZrO_2$, and particles in the size range from 150 nm to 5 µm and combinations thereof, the filler content of the shaped body preferably being at least 15% by weight.% by weight, preferably from 20% to 65% by weight, and wherein the shaped body has more preferably a flexural strength of at least 130 MPa, even more preferably of at least 150 MPa, and/or a modulus of elasticity of at least 5.0 GPa. Instead or in addition, the shaped body may contain dispersed inorganic nanoparticles with particle sizes in the range from 5 to 100 nm and particles in the size range from 150 nm to 5 µm and/or have a—if necessary fluorescent—material that is capable of absorbing light in the wavelength range from 320 nm to 480 nm and preferably from 380 nm to 420 nm.

The individual, above-mentioned constituents of the liquid or viscous material in the process according to (i) are as indicated in the description above, to which explicit reference is made here, with the exception of the definition of the polysiloxane component as such. Although this component also has the above-mentioned properties, it may also contain silanes with only one hydrolytically condensable group.

The above-mentioned embodiment of the invention solves the problem of providing a shaped body whose optical properties and in particular its translucency can be improved or adjusted more precisely and/or which can be printed more precisely, i.e. which shows only a low FD. In this respect, reference can be made to the details of the description as far as it deals with the additives which must be contained in the three variants of this process as part of the liquid or viscous material or the polysiloxane component.

9. Further Embodiment Examples 9.1 Resin Systems Used

Resin System 5 (See EP 0451709, EP 0450624):

161.74 g (744.2 mmol) 3-isocyanatopropylmethyl diethoxysilane is added to 0.47 g (0.744 mmol) dibutyltin dilaurate as catalyst and 159.42 g (744.2 mmol) glycerol 1,3-methacrylate acrylate under oxygen atmosphere, and stirring is carried out at 30° C. (approx. 21 h). The reaction can be followed by NMR and IR by decreasing the isocyanate concentration. After addition of acetic ester (300 ml/mol silane) and an $EtOH/H_2O$ solution (volume ratio 1:1) with $H_2O$ for hydrolysis and HCl as catalyst is stirred at 30°

C. After 30 minutes, 30.41 g (148.8 mmol) (methacryloxymethyl)methyl dimethoxysilane is added. After stirring for several days, the preparation is neutralized with aqueous NaOH, extracted with water and filtrated through hydrophobized filters. BHT is dissolved as stabilizer. Afterwards, it is first rotated off and then extracted with oil pump vacuum. The result is a liquid resin with a viscosity of =81 Pa·s at 25° C. and a refractive index of $n_D$=1.485.

Resin System 6 (See DE 102013108594):

2.5290 g (20.363 mmol) methylthiophenol are added to resin system 5 (15.8445 g; 40.725 mmol) dissolved in 40 ml THF and diazabicycloundecene (0.0031 g; 0.020 mmol) as catalyst under argon atmosphere, and stirring is carried out at 30° C. (approx. 45 min). The reaction can be followed by NMR by decreasing the acrylate concentration. Processing is carried out e.g. by rotating the THF with subsequent precipitation with water and washing with water. Then 40 ml EE are added with subsequent filtration through hydrophobic filters. It is first rotated off and then removed with oil pump vacuum. The result is a liquid resin with a viscosity of =185 Pa·s at 25° C. and a refractive index of $n_D$=1.509.

Due to the different reactivities of the acrylate group and methacrylate group, selective addition to the acrylate group is possible.

9.2 Composites a) Nanohybrid Composites with $ZrO_2$—NP, Dental Glass Particles and Organic Absorber Composite I: Composition and Production:

nanohybrid composite with $ZrO_2$-NP (silanized, company Pixelligent, PixClear PCPB-2-50-ETA, particle size 7-10 nm) and dental glass particles (silanized, type GM27884, primary particle diameter of 0.7 μm)) in the ratio $ZrO_2$-NP:DGP=1:4.95 and a total filler content of 56.5 wt %.

LTPO and TBT were added to resin system 2 and then the $ZrO_2$—NP, which is dispersed in ethyl acetate at 50% by weight, was also added. After dissolving the initiator and absorber and after complete dispersion of the nanoparticles, the solvent was removed under reduced pressure.

The dental glass particles were then added and homogeneously incorporated by means of a three-roll mill.

conventional rod manufacturing as described in Section 3.1 I.

3D elongated rods of composites I and II: Post-treatment of the rods as described in section 5.1 II.

3D-printed rods of resin systems 2, 5 and 6: Post-treatment of the rods as described in Section 5.1 II.

Composite II: Composition and Production:

Nanohybrid composite with $ZrO_2$—NP (silanized, company Pixelligent, PixClear PCPB-2-50-ETA, particle size 7-10 nm) and dental glass particles (silanized, type GM27884, primary particle diameter of 0.7 μm)) in the ratio $ZrO_2$—NP:DGP=1:1.71 and a total filler content of 47.5 wt %.

LTPO and TBT were added to resin system 5 and then the $ZrO_2$—NP dispersed in ethyl acetate at 50% by weight was also added. After dissolving the initiator and absorber and after complete dispersion of the nanoparticles, the solvent was removed under reduced pressure. The dental glass particles were then added and homogeneously incorporated by means of a three-roll mill.

Conventional rod production and post-treatment of the printed rods as in composite I.

b) Macro-Composite with Dental Glass Particles

Composite III: Composition and Production:

Macro-composite with dental glass particles (silanized, type GM27884, primary particle diameter of 0.7 μm), filler content of 30 weight %.

LTPO was added to resin system 4 and dissolved while stirring at 35° C. The dental glass particles were then added and homogeneously incorporated using a three-roll mill.

conventional rod fabrication as with composite I

TABLE 1

| Material system | LTPO/DBPO [weight %] | Viscosity [Pas] 25/40° C. | Translucency [%] | Refractive index uncured | Layer thickness for 3D printing [μm] | Exposure time for 3D printing [s] | $F_{max}$ [MPa] conv./3D printing | Young's modulus [GPa] conv./3D printing |
|---|---|---|---|---|---|---|---|---|
| Resin system 2 | 2/0 | 31/6 *** | 83 * | 1.484 *** | 50 | 20 | 117/118 | 3.0/3.1 |
| Composite I Nanohybrid composite of resin system 2 with 56.5 wt % filler and TBT (0.0010 mmol/g resin) | 1/0 | 322/59 | 71 w/o TBT | n.d. | 50 | 24 | 146/143 | 6.1/5.5 |
| Resin system 5 | 2/0 | 89/12 *** | 85 * | 1.485 *** | 50 | 20 | 110/119 | 3.4/3.8 |
| Composite II Nanohybrid composite of resin system 5 with 47.5 wt % filler and TBT (0.0010 mmol/g resin) | 1/0 | 395/54 | 52 w/o TBT | n.d. | 50 | 24 | 129/135 | 5.0/5.4 |
| Resin system 6 | 1/0 | 185/23 *** | n.d. | 1.509 *** | — | — | 111/n.d. | 2.8/n.d. |
| Composite III Nanohybrid composite of resin system 6 with 30 wt % filler | 1/0 | 346/42 | 73 | n.d. | — | — | n.d./n.d. | n.d./n.d. |

(Note: The data in the table refer to the respective material composition in the left column. Deviations from this are also indicated in the respective column).
* = with 1 wt % LTPO;
*** = without initiator The translucency of the composites was investigated using translucency plates. It was shown that composite II without TBT and especially composite I without TBT showed a very high translucency at a high total filler content. Composite III also showed high translucency. This was achieved by adjusting the refractive index of the resin systems (either by means of $ZrO_2$ nanoparticles (in composites I and II) or the matrix itself (in composite III) to the refractive index of the dental glass particles used. In addition, model teeth were 3D-printed and polished after the usual post-treatment. The printed model teeth of composites I and II showed a very good component quality (good surface quality, high dimensional fidelity, good polishability).

What is claimed is:

1. A method for producing a shaped body with the aid of a radiation-induced printing process according to the technique of the one-photon polymerization process, characterized in that:
    the shaped body is produced by solidifying a liquid or viscous material which contains a polysiloxane component formed by hydrolytic condensation of one or more monomeric silanes having exclusively two or three hydrolyzable groups and at least one organically polymerizable radical being bonded to the silicon atom via carbon, and an initiator and/or catalyst for the radiation-induced polymerization of the organically polymerizable radical, and
    the solidification is effected by directing light from a radiation source onto a region of a surface of a substrate, a layer of the liquid or viscous material located there being subjected to organic polymerization by the action of radiation and thereby solidified, whereupon further layers of the liquid or viscous material, each of which is located on the layer of the last solidified material, are successively solidified with the aid of this radiation source,
    wherein the shaped body is in the form of a composite which, in addition to the organically polymerized silica (hetero)polycondensate, contains at least one filler selected from fillers consisting of agglomerated or dispersed inorganic nanoparticles having particle sizes in the range from 5 to 100 nm and particles in the size range from 150 µm to 5 µm and combinations thereof, wherein the filler content of the shaped body is at least 15% by weight and wherein the shaped body has a flexural strength of at least 130 MPa and/or a modulus of elasticity of at least 5.0 GPa.

2. The method according to claim 1, wherein the liquid or viscous material is in a bath container having a bottom which is at least partially translucent, and the substrate is a platform immersed in the liquid or viscous material and movable away from the bath bottom.

3. The method according to claim 1, wherein the shaped body, after its formation in the interior of the bath, is removed from the latter, washed with a solvent, dried and is then either (a) thermally post-cured, whereby a peroxide can be added to the bath material as initiator for the thermal curing, or (b) post-cured by photoinitiation.

4. The method according to claim 1, wherein the liquid or viscous material is a composite containing a particulate or fibrous additive.

5. The method according to claim 4, wherein the refractive index of the particulate additive prior to solidification is greater than that of the polysiloxane component.

6. The method according to claim 1, in which the liquid or viscous material comprises a material which is in particle form or is dissolved in the polysiloxane component and which is capable of absorbing light of a wavelength corresponding to the wavelength of the radiation source used.

7. The method according to claim 1, wherein the polysiloxane component contains aryl groups attached to radicals bonded to silicon via carbon atoms.

8. The method according to claim 1, wherein the polysiloxane component contains phosphonic acid groups, phosphinic acid groups, phosphate groups, sulphonic acid groups, sulphinic acid groups and/or carboxylic acid groups, each of which is attached to radicals bonded to silicon via carbon atoms.

9. A shaped body based on an organically polymerized silica (hetero)polycondensate which has been formed by organic polymerization of a polysiloxane component which has been produced by hydrolytic condensation of one or more monomeric silanes having exclusively two or three hydrolysable groups and at least one organically polymerizable radical being bonded to the silicon atom via carbon, obtainable with the aid of a radiation-induced printing process according to the technique of the one-photon polymerization process, characterized in that:
    the shaped body is produced by solidifying a liquid or viscous material which contains a polysiloxane component formed by hydrolytic condensation of one or more monomeric silanes having exclusively two or three hydrolyzable groups and at least one organically polymerizable radical being bonded to the silicon atom via carbon, and an initiator and/or catalyst for the radiation-induced polymerization of the organically polymerizable radical, and—the solidification is effected by directing light from a radiation source onto a region of a surface of a substrate, a layer of the liquid or viscous material located there being subjected to organic polymerization by the action of radiation and thereby solidified, whereupon further layers of the liquid or viscous material, each of which is located on the layer of the last solidified material, are successively solidified with the aid of this radiation source, and
    the shaped body has a flexural strength, as determined with a 3-point flexural test according to test standard DIN EN ISO 4049: 2009 with the universal testing machine Z100 of the company Zwick/Roell, with the changes that instead of water storage a dry storage preceded and that the feed rate was 3 mm/min, of at least 60 MPa and/or a modulus of elasticity, as determined in the linear range of the stress-strain curve between 10-20 MPa over the secant, of at least 1.4 GPa,
    wherein the shaped body is in the form of a composite which, in addition to the organically polymerized silica (hetero)polycondensate, contains at least one filler selected from fillers consisting of agglomerated or dispersed inorganic nanoparticles having particle sizes in the range from 5 to 100 nm and particles in the size range from 150 µm to 5 µm and combinations thereof, wherein the filler content of the shaped body is at least 15% by weight and wherein the shaped body has a flexural strength of at least 130 MPa and/or a modulus of elasticity of at least 5.0 GPa.

10. The shaped body according to claim 9, which is built up in a spatial direction from individual layers with a thickness in the range from 10 to 150 µm or in which the layers have been formed by continuous exposure to light.

11. The shaped body according to claim 9 with a flexural strength of at least 100 MPa and a modulus of elasticity of at least 3.2 GPa.

12. The shaped body according to claim 9, which contains dispersed inorganic nanoparticles with particle sizes in the range from 5 to 100 nm and particles in the size range from 150 nm to 5 µm.

13. The shaped body according to claim 9, which further comprises a material capable of absorbing light in the wavelength range from 320 nm to 480 nm.

* * * * *